US010002255B2

(12) United States Patent
Chang et al.

(10) Patent No.: US 10,002,255 B2
(45) Date of Patent: Jun. 19, 2018

(54) METHOD AND DEVICE FOR CONTROLLING SECURITY SCREEN IN ELECTRONIC DEVICE

(71) Applicant: Samsung Electronics Co., Ltd., Suwon-si, Gyeonggi-do (KR)

(72) Inventors: Moonsu Chang, Yongin-si (KR); Yangsoo Lee, Yongin-si (KR); Eunjung Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/683,774

(22) Filed: Apr. 10, 2015

(65) Prior Publication Data

US 2015/0295897 A1 Oct. 15, 2015

(30) Foreign Application Priority Data

Apr. 11, 2014 (KR) .................. 10-2014-0043528
Apr. 9, 2015 (KR) .................. 10-2015-0050105

(51) Int. Cl.
*G06F 21/00* (2013.01)
*G06F 21/60* (2013.01)
*H04W 12/06* (2009.01)
*G06F 21/84* (2013.01)
*H04W 4/00* (2018.01)

(52) U.S. Cl.
CPC .............. *G06F 21/60* (2013.01); *G06F 21/84* (2013.01); *H04W 12/06* (2013.01); *H04W 4/008* (2013.01)

(58) Field of Classification Search
CPC .. G06F 21/10; G06F 2221/0737; G06F 21/60; G06F 21/84; H04L 63/04; H04W 12/06
See application file for complete search history.

(56) References Cited

U.S. PATENT DOCUMENTS 7,779,475 B2 * 8/2010 Jakobson ............... G06F 21/62
726/26
8,122,496 B2 * 2/2012 Achari .................... G06F 21/84
726/16

(Continued)

FOREIGN PATENT DOCUMENTS

KR 10-2007-0016029 A 2/2007
KR 10-1201970 B 11/2012

(Continued)

*Primary Examiner* — Brandon Hoffman
*Assistant Examiner* — Helai Salehi
(74) *Attorney, Agent, or Firm* — Jefferson IP Law, LLP

(57) ABSTRACT

A device and a method for controlling a security screen in an electronic device are provided. The electronic device includes a display module, a first memory having at least one display data stored therein, a composing module that composes a plurality of display layers each including at least one display data and displays the same on the display module, and a control module that controls at least one of the display module, the first memory, or the composing module, wherein the control module identifies a type of the at least one display data included in each of the plurality of display layers and controls the attributes of the plurality of display layers to display a display layer including security data, among the plurality of display layers, at the uppermost position when the identified display data is the security data.

18 Claims, 23 Drawing Sheets

(56) References Cited

U.S. PATENT DOCUMENTS

| | | | |
|---|---|---|---|
| 2005/0091486 A1 | 4/2005 | Avraham et al. | |
| 2008/0025645 A1 | 1/2008 | Jakobson et al. | |
| 2008/0222446 A1* | 9/2008 | Yasaki | G06F 11/324 714/1 |
| 2009/0150824 A1 | 6/2009 | Furuichi | |
| 2012/0255029 A1* | 10/2012 | Kim | G06F 21/10 726/26 |
| 2014/0176562 A1* | 6/2014 | Somerfield | G06T 11/00 345/443 |

FOREIGN PATENT DOCUMENTS

| | | |
|---|---|---|
| KR | 10-1349526 B1 | 1/2014 |
| WO | 2007-007988 A2 | 1/2007 |

\* cited by examiner

FIG. 10

| ALPHA VALUE | DATA TYPE | Contents |
|---|---|---|
| 0 | GENERAL DATA | 1. Status Bar |
| 0 | GENERAL DATA | 2. App #1 |
| 1 | SECURITY DATA | 3. Marker |
| 0 | GENERAL DATA | 4. App #2 |
| 0 | PROTECTED DATA | 5. Video Data |

| ALPHA VALUE | DATA TYPE | Contents |
|---|---|---|
| 0 | GENERAL DATA | 1. Status Bar |
| 0.9 | GENERAL DATA | 2. App #1 |
| 1 | SECURITY DATA | 3. Marker |
| 0.5 | GENERAL DATA | 4. App #2 |
| 0.7 | PROTECTED DATA | 5. Video Data |

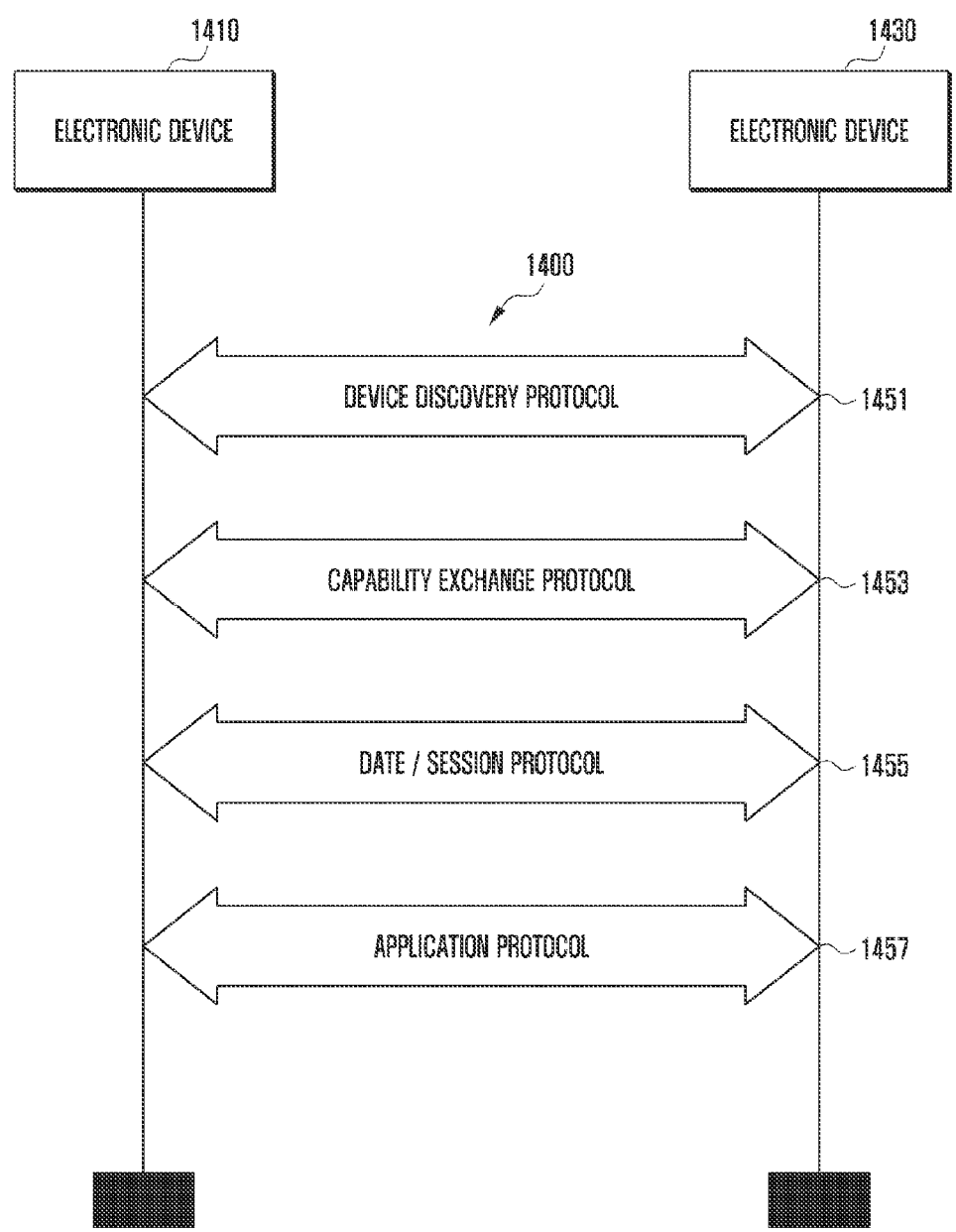

METHOD AND DEVICE FOR CONTROLLING SECURITY SCREEN IN ELECTRONIC DEVICE

CROSS-REFERENCE TO RELATED APPLICATION(S)

This application claims the benefit under 35 U.S.C. § 119(a) of a Korean patent application filed on Apr. 11, 2014 and assigned Ser. No. 10-2014-0043528 and a Korean patent application filed on Apr. 9, 2015 and assigned Ser. No. 10-2015-0050105, the entire disclosure of which is hereby incorporated by reference.

TECHNICAL FIELD

The present disclosure relates to a method and device for controlling the display of a security screen in an electronic device.

BACKGROUND

With the performance enhancement of electronic devices, services employed for computers can be used in the electronic devices. For example, users can carry out Internet banking or Internet shopping using electronic devices. In this case, the users' personal information is used for financial services such as Internet banking and Internet shopping. Since the financial services are the main targets of malicious attackers, a higher security level always has to be maintained when displaying personal information. In particular, as attacks in the form of hacking into user input values in the electronic devices or modifying output values by the malicious attackers are increasing, devices and methods for displaying a security screen are desired.

The above information is presented as background information only to assist with an understanding of the present disclosure. No determination has been made, and no assertion is made, as to whether any of the above might be applicable as prior art with regard to the present disclosure.

SUMMARY

The electronic devices, when displaying a security screen, may divide data to be displayed on a screen into security data and non-security data, compose them into one screen, and display the composite screen. The electronic devices may make the security data and the non-security data transparent or opaque and display them in one or more regions of the screen in such a manner that the security data and the non-security data overlap each other. When a situation occurs where an additional user interface (UI), such as a caption, which is non-security data is to be displayed on the security screen, the electronic devices may display the non-security data, namely the additional UI such as a caption, on the security screen.

However, when the non-security data is displayed on the security data, malware may be displayed to cover the security screen. Due to this, the security screen region may lose its original security function. In addition, when displaying security data, electronic devices cannot display the security data on a security screen in an environment in which a security operating system is not supported.

Aspects of the present disclosure are to address at least the above-mentioned problems and/or disadvantages and to provide at least the advantages described below. Accordingly, an aspect of the present disclosure is to provide a method for and device for displaying data that is not to be modified in order to stably display the data. In addition, another aspect of the present disclosure is to provide a method and device for flexibly arranging display layers even without the existing security operating system.

Accordingly, an aspect of the present disclosure is to provide a method and device for displaying data that is not to be modified in order to stably display the data. In addition, another aspect of the present disclosure is to provide a method and device for flexibly arranging display layers even without the existing security operating system.

Another aspect of the present disclosure is to provide a method and device that can use a security function supported by separately designated hardware in addition to a hardware security function supported by a processor, including at least one layer.

To this end, an electronic device that includes a security operating device and/or a security program while supporting a plurality of layers may make a control to display non-modified stable information on a security screen. Here, the security operating device and/or the security program may be a hardware security function supported by a processor such as Trust zone, a device using separately designated hardware other than a processor, or a device using security software.

In accordance with an aspect of the present disclosure, an electronic device is provided. The device includes a display module, a first memory having at least one display data stored therein, a composing module that composes a plurality of display layers each including at least one display data and displays the same on the display module, and a control module that controls at least one of the display module, the first memory, or the composing module, wherein the control module identifies a type of the at least one display data included in each of the plurality of display layers and controls the attributes of the plurality of display layers to display a display layer including security data, among the plurality of display layers, at the uppermost position when the identified display data is the security data.

In accordance with another aspect of the present disclosure, an electronic device is provided. The device includes a display module, a first memory having at least one display data stored therein, a composing module that composes a plurality of display layers each including at least one display data and display the same on the display module, and a control module configured to control at least one of the display module, the first memory, or the composing module, wherein the control module identifies a type of the at least one display data included in each of the plurality of display layers, and controls the attributes of the plurality of display layers to opaquely display a display layer including security data among the plurality of display layers and to transparently display layers including protected data and general data among the plurality of display layers when the identified display data is the security data.

In accordance with another aspect of the present disclosure, a method is provided. The method includes identifying a plurality of display layers each including at least one display data, identifying the type of the at least one display data included in each of the plurality of display layers, controlling the attributes of the plurality of display layers to display a display layer including security data, among the plurality of display layers, at the uppermost position when the identified display data is the security data, and composing the plurality of display layers and displaying the same.

In accordance with another aspect of the present disclosure, a method is provided. The method includes identifying a plurality of display layers each including at least one display data, identifying a type of the at least one display data included in each of the plurality of display layers, controlling the attributes of the plurality of display layers to opaquely display a display layer including security data among the plurality of display layers and to transparently display layers including protected data and general data among the plurality of display layers when the identified display data is the security data, and composing the plurality of display layers and displaying the same.

In accordance with another aspect of the present disclosure, a non-transitory computer readable recording medium is provided in which a program is recorded for identifying a plurality of display layers each including at least one display data, identifying a type of the at least one display data included in each of the plurality of display layers, controlling the attributes of the plurality of display layers to display a display layer including security data, among the plurality of display layers, at the uppermost position when the identified display data is the security data, and composing the plurality of display layers.

An electronic device according to various embodiments of the present disclosure can always display whether a security function is operated. In order to indicate that the security function is being operated, the electronic device can display a mark or text on the entire or partial region of a screen thereof. This helps a user easily identify whether the security function is being operated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages certain embodiments of the present disclosure will be more apparent from the following description taken in conjunction with the accompanying drawings, in which:

FIG. 10 illustrates an example of a method for opaquely displaying display data of a display layer according to various embodiments of the present disclosure;

FIG. 14 illustrates a communication protocol between a plurality of electronic devices according to various embodiments of the present disclosure.

Throughout the drawings, it should be noted that like reference numbers are used to depict the same or similar elements, features, and structures.

DETAILED DESCRIPTION

Figure 1:
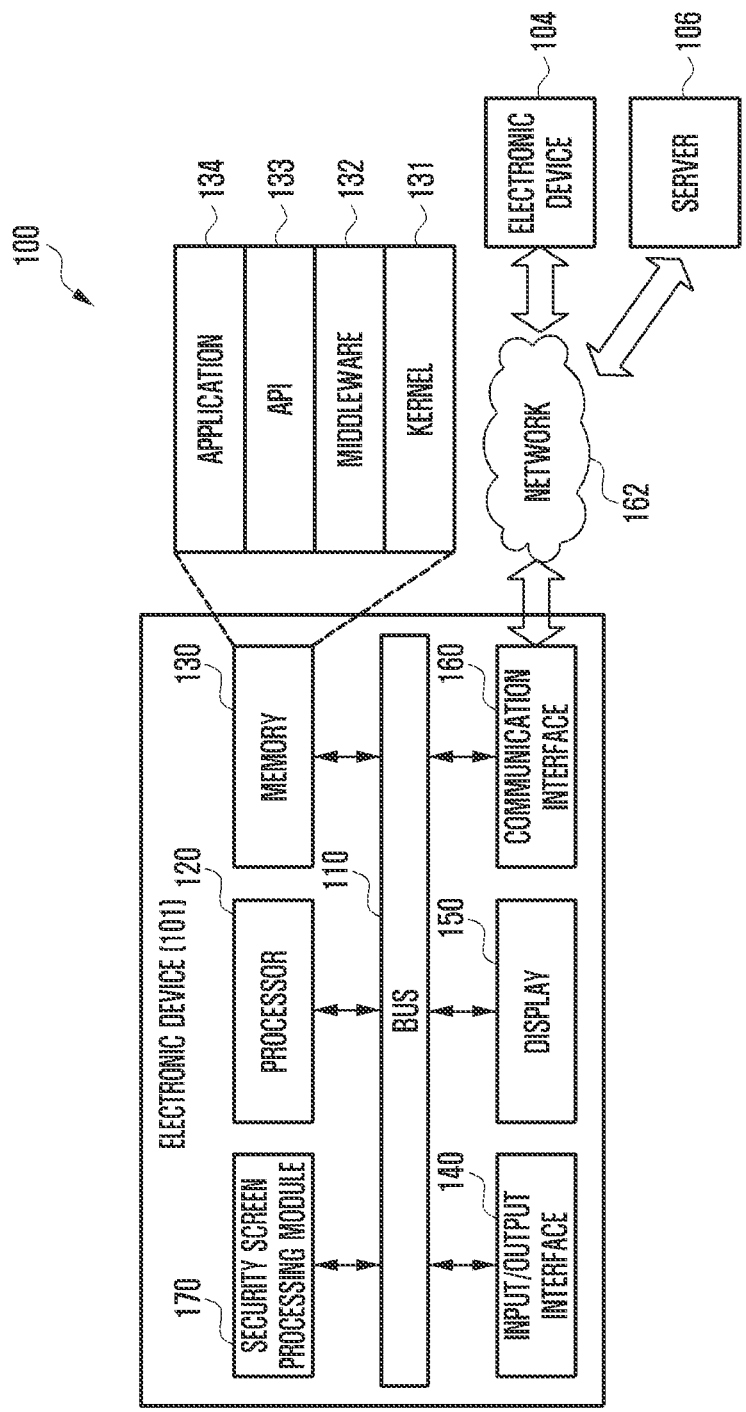
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B. The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a projection function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a projection function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in the various embodiments may refer to a person or a device (e.g., an artificial intelligence electronic device) using the electronic device. In the embodiments of the present disclosure, display data displayed on a screen is classified into three types of data according to whether data integrity and data confidentiality are ensured. The three types of display data include security data, protected data, and general data.

Here, data integrity is an attribute configured for data security and may be configured in such a manner that data may be changed or deleted by an authorized user.

Data confidentiality is an attribute configured for data security, and authority may be configured in such a manner that only an authorized user may access and read data.

First, the security data has to simultaneously satisfy data integrity and data confidentiality and may be configured not to be modified by hacking in any situation. In a situation of maintaining security, such security data may be displayed with a symbol, a mark, an icon, text, an identification sign, a color, or the like to inform whether security is maintained. The security data may be configured to be disposed at the uppermost position based on the Z-axis so that a user may always view the same. The operation of disposing the security data at the uppermost position based on the Z-axis may be performed by arranging a layer including the security data based on the Z-axis to dispose the layer at the uppermost position. For example, the security data may be a security keypad, an icon for identifying a security state, text including a security message, or the like. Accordingly, through the display of the security data, the user may recognize whether security is maintained.

In an embodiment, security data may be stored in a memory or a composing module, and a memory in a control module during electronic device manufacturing, a user setting operation, or an application installation operation, and for convenience of description, it may be assumed that the security data is stored in the memory.

In an embodiment, the security data stored in the memory may be transmitted to the composing module via the same path as protected data and general data when a particular application is executed.

In an embodiment, the security data stored in the memory may be transmitted to the composing module via a different path from protected data and general data when a particular application is executed.

In an embodiment, the security data stored in the memory may be configured within the composing module. In this case, the composing module, when receiving protected data and general data while the security data is stored therein, may compose the security data, the protected data, and the general data into one screen to display the composite screen on a display.

Second, the protected data ensures only data confidentiality and may be read (referred to) only in a situation in which particular access authority is granted. While such protected data is displayed on a screen, when an additional UI, such as a caption, a status bar, or a slider bar, is displayed, the additional UI may be arranged based on the Z-axis to be displayed on the protected data. For example, the protected data may be copyright-protected movie content or user personal information that a user downloads with a fee.

Last, the general data does not ensure data integrity and data confidentiality. Accordingly, there is no limitation in data access such as data reading and writing so that the general data has a very low security level and may be freely displayed. Such general data may be configured to be displayed above or below protected data based on the Z-axis. The general data may be displayed above the protected data in order to enable a user to intuitively control an application. For example, the general data may be a caption, a status bar, a slide bar, or the like.

FIG. 1 illustrates a network environment 100 including an electronic device 101 according to various embodiments of the present disclosure.

Referring to FIG. 1, the network environment 100 includes an electronic device 101, an electronic device 104, a server 106, and a network 162. The electronic device 101 includes a bus 110, a processor 120, a memory 130, an input/output interface 140, a display 150, a communication interface 160, and a security screen processing module 170.

The bus 110 may be a circuit connecting the above described components and transmitting communication (for example, a control message) between the above described components.

The processor 120 receives commands from other components (for example, the memory 130, the input/output interface 140, the display 150, the communication interface 160, or the projecting management module 170) through the bus 110, analyzes the received commands, and executes calculation or data processing according to the analyzed commands.

The processor 120 may perform functions of a control module 220 and a separate control module 221 of FIG. 2A to FIG. 2C which will be described below.

The memory 130 stores commands or data received from the processor 120 or other components (for example, the input/output interface 140, the display 150, the communication interface 160, or the projecting management module 170) or generated by the processor 120 or other components. The memory 130 may include programming modules, for example, a kernel 131, middleware 132, an Application Programming Interface (API) 133, and an application 134. Each of the aforementioned programming modules may be implemented by software, firmware, hardware, or a combination of two or more thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (for example, command) for a file control, a window control, image processing, or a character control.

According to various embodiments, the application 134 may include a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 may be an application related to an information exchange between the electronic device 101 and an external electronic device (for example, electronic device 104). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 101 to the external electronic device (for example, electronic device 104). Additionally or alternatively, the notification relay application may receive notification information from, for example, the external electronic device 104 and provide the received notification information to the user. The device management application may manage (for example, install, remove, or update) at least a part of functions (for example, turning on/off the external electronic device (or some components of the external electronic device) or controlling a brightness of the display) of the external electronic device (104 communicating with the electronic device 101, an application executed in the external electronic device 104, or a service (for example, call service or message service) provided by the external electronic device 104.

According to various embodiments, the application 134 may include an application designated according to an attribute (for example, type of electronic device) of the external electronic device 104. For example, when the external electronic device 104 is a digital audio player, the application 134 may include an application related to music reproduction. Similarly, when the external electronic device 104 is a mobile medical device, the application 134 may include an application related to health care. According to an embodiment, the application 134 may include at least one of an application designated to the electronic device 101 and an application received from an external electronic device (for example, server 106 or electronic device 104).

The input/output interface 140 transmits a command or data input from the user through an input/output device (for example, a sensor, a keyboard, or a touch screen) to the processor 120, the memory 130, the communication interface 160, or the display control module 170 through, for example, the bus 110. For example, the input/output interface 140 may provide data on a user's touch input through a touch screen to the processor 120. Further, the input/output interface 140 may output a command or data received, through, for example, the bus 110, from the processor 120, the memory 130, the communication interface 160, or the projecting management module 170 through the input/output device (for example, a speaker or a display). For example, the input/output interface 140 may output voice data processed through the processor 120 to the user through the speaker.

The display 150 displays various pieces of information (for example, multimedia data, text data, or the like) for the user. The communication interface 160 connects communication between the electronic device 101 and the external device (for example, electronic device 104 or server 106). For example, the communication interface 160 may access a network 162 through wireless or wired communication to communicate with the external device. The wireless communication includes at least one of, for example, WiFi, BlueTooth (BT), Near Field Communication (NFC), GPS, and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The telecommunication network includes at least one of a computer network, Internet, Internet of things, and a telephone network. According to an embodiment, a protocol (for example, transport layer protocol, data link layer protocol, or physical layer protocol) for communication between the electronic device 101 and the external device may be supported by at least one of the application 134, the application programming interface 133, the middleware 132, the kernel 131, and the communication interface 160.

According to an embodiment, the security screen processing module 170 may process and display a display layer including security data among the information acquired from the other elements. Here, the security data is one of the display data included in the display layer, and the types of the display data include security data, protected data, and general data. For example, when there is a display layer including protected data, the security screen processing module 170 may control the attribute of the security data to arrange the security data at the uppermost position or to opaquely display the security data. Additional information on the security screen processing module 170 will be provided through FIGS. 2A, 2B, 2C, 3A, 3B, 3C, 4A, 4B, 4C, 4D, 5, 6, 7A, 7B, 8, 9, 10, 11, 12A, 12B, 13, and 14 which will be described below.

In addition, the operation performed by the security screen processing module 170 may be described based on a method of controlling a security screen including protected data through a control module and a composing module.

Figure 2A:
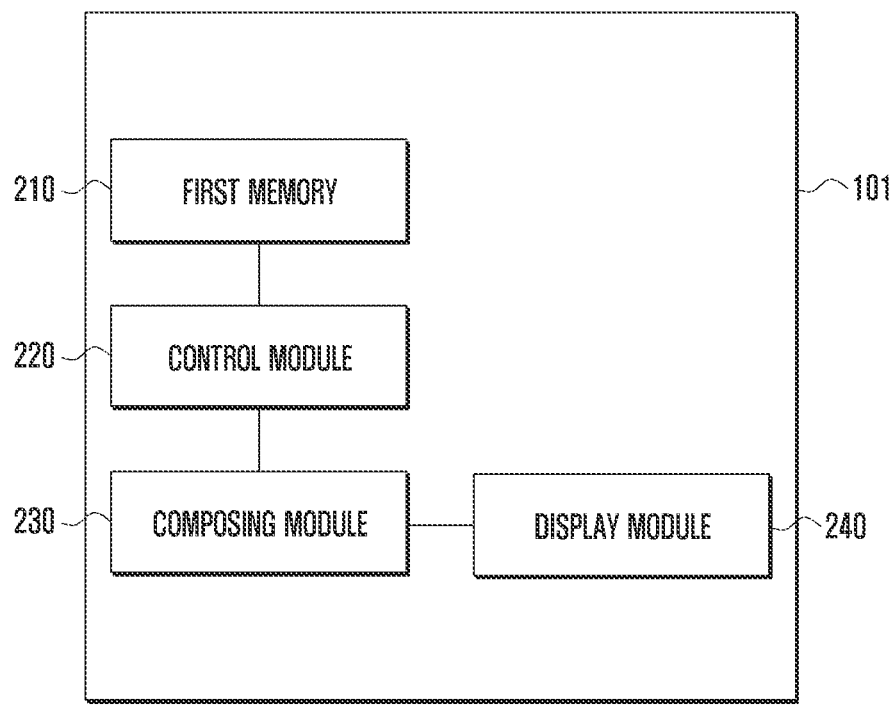
FIGS. 2A, 2B, and 2C are schematic block diagrams of electronic devices according to various embodiments of the present disclosure.
Figure 2B:
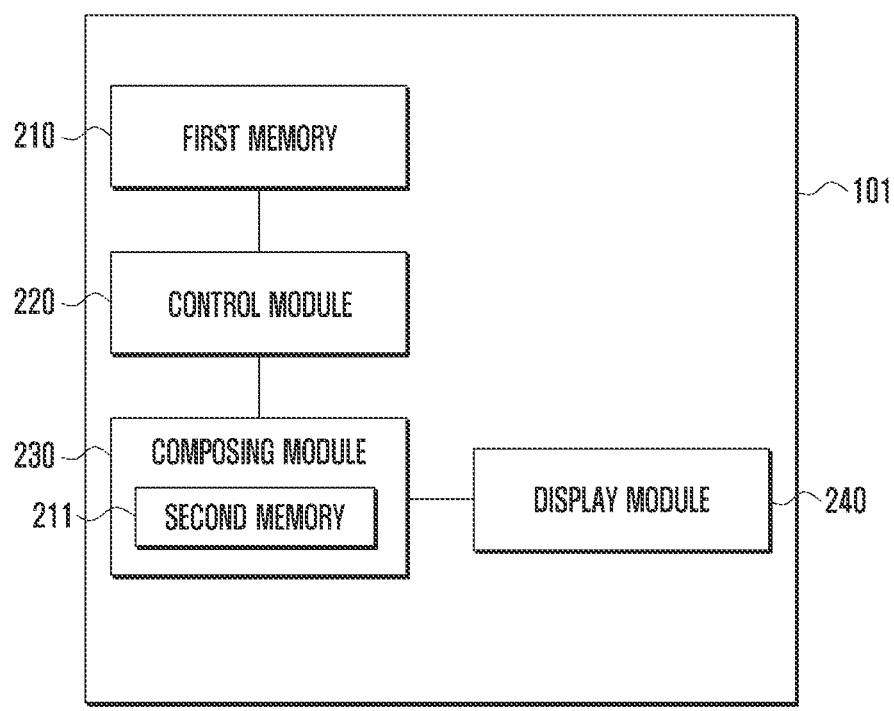
Figure 2C:
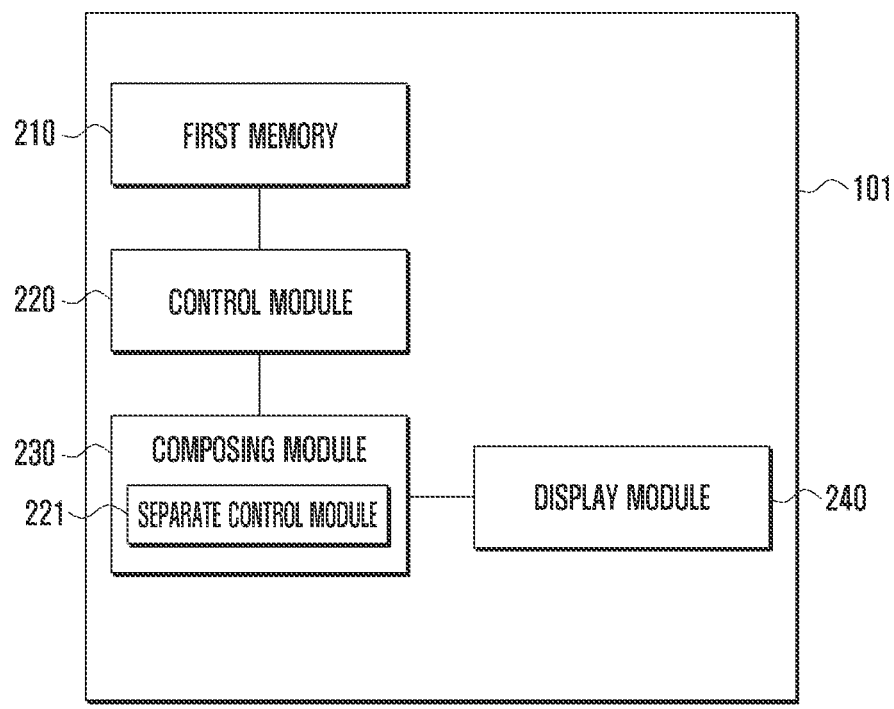

FIGS. 2A, 2B, and 2C are schematic block diagrams of electronic devices (e.g., the electronic device 101) according to various embodiments of the present disclosure.

Referring to FIG. 2A, the electronic device 101 may include a memory 210, a control module 220, a composing module 230, and a display module 240.

The memory 210 may store the types of display data and may store different processing methods according to the types of display data. The types of display data include security data, protected data, and general data. Accordingly, the memory 210 may store the different processing methods according to the types of display data. In addition, the memory 210 may store security data for displaying whether security is maintained.

In an embodiment, the memory 210 may store a value that is set to dispose a display layer including security data at the uppermost position based on the Z-axis under the control of the control module 220.

In an embodiment, in a situation in which a display layer including general data is displayed while a display layer including protected data is being displayed, the memory 210 may store a value that is set to display the display layer including the protected data at a lower position based on the Z-axis than the display layer including the general data under the control of the control module 220.

The control module 220 may operate in a security mode or in a non-security mode. The control module 220 may control display data displayed on a plurality of display layers to operate in the security mode or in the non-security mode. For example, when there are display layers including security data and protected data, the control module 220 may control the security data and the protected data to operate in the security mode, and when there is a display layer including general data, the control module 220 may control the general data to operate in the non-security mode.

The control module 220, when operating in the security mode to process security data, may make a control such that a display layer operating in the non-security mode does not recognize operations of processing the display layer including the security data. The control module 220 may display, on the display layer including the security data, whether the security data operates in the security mode. The security data may be displayed with a symbol, a mark, an icon, text, an identification sign, a color, or the like.

The control module 220 may transfer, to the composing module 230, a plurality of display layers including at least one display data. Here, the transferred display data may be security data, protected data, and general data.

In an embodiment, the control module 220 may transmit security data, protected data, and general data, which are individually generated, to the composing module through the same path.

The composing module 230 performs a function of arranging the positions of the plurality of display layers or adjusting the transparency thereof and then composing the display layers into one screen under the control of the control module 220. Here, the display layers may include a 3 dimensional (3D) object. That is, the composing module 230 may compose the received display layers into one screen and transmit the screen to the display module 240 under the control of the control module 220.

When a display layer including security data is among the plurality of display layers, the composing module 230 may arrange the display layer including the security data to dispose the same at the uppermost position under the control of the control module 220. In addition, when the display layer including the security data exists, the composing module 230 may adjust the transparency of the display layer to be opaque. In this case, the security data may be displayed with a symbol, a mark, an icon, text, an identification sign, a color, or the like that can represent whether security is maintained. Thereafter, the composing module 230 may compose the plurality of display layers, adjusted in response to the types of display data, into one screen under the control of the control module 220. The composing module 230 may arrange the positions of the plurality of display layers based on the Z-axis or adjust the transparency thereof based on alpha values under the control of the control module 220. Here, the alpha values are set to adjust the transparency of the display layers. For example, the alpha values may be set between 0 and 1. The display layers may be configured to have different alpha values according to the adjusted transparency. For example, an alpha value of 0 indicates a transparent state, and an alpha value of 1 indicates an opaque state.

The display module 240 may be configured to display the display layer including the security data under the control of the control module 220. That is, the display module 240 may display one screen obtained by composing the plurality of display layers under the control of the control module 220. The display module 240 may be an element configured to control the display of the screen on the display 150 of the electronic device.

FIG. 2B is a schematic block diagram of the electronic device 101 in which the composing module 230 includes a second memory. Referring to FIG. 2B, the electronic device 101 may include the memory 210, the control module 220, the composing module 230, and the display module 240 as in FIG. 2A. In this case, the composing module 230 may have a separate memory 211 therein.

The separate memory 211 may perform the same function as the memory 210 and may be configured to store security data at the same time under the control of the control module 220. That is, the separate memory 211 may store, under the control of the control module 220, security data for representing whether security is maintained. In addition, without being limited thereto, the separate memory 211 may be configured to be integral or external to the composing module 230 and may store protected data and general data.

The control module 220 may make a control to display whether security is maintained as an application is executed. When the application is executed, the control module 220 may display, on a display layer including security data, whether the application operates in a security mode, using a symbol, a mark, an icon, text, an identification sign, a color, or the like.

In an embodiment, when a particular application is executed, the control module 220 may transfer the security data stored in the separate memory 211 to the composing module 230. When transferring the security data stored in the separate memory 211 to the composing module 230, the control module 220 may make a control to transfer, to the composing module 230, the security data through a different path from protected data and general data temporarily stored (loaded) in the memory 210. As such, the control module 220, when transferring the security data to the composing module 230, may make a control to transfer the same through the different path from the protected data and the general data.

The composing module 230 may receive the security data through the different path from the protected data and the general data under the control of the control module 220. The composing module 230 may compose the plurality of display layers including the display data received through the different paths. In order to display one screen obtained by composing the plurality of display layers, the composing module 230 may transfer the composite screen to the display module 240 under the control of the control module 220.

The display module 240 may be an element configured to control the display of the screen on the display 150 of the electronic device.

FIG. 2C is a block diagram of the electronic device 101 in which the composing module 230 includes a separate control module 221.

Referring to FIG. 2C, the electronic device 101 may include the memory 210, the control module 220, the composing module 230, and the display module 240 as in FIG. 2A.

The composing module 230 may include the separate control module 221. Accordingly, the control modules may be configured one of integral and external to the composing module 230. The control module external to the composing module 230 is the existing control module 220, and the control module integral to the composing module 230 is the separate control module 221.

Here, the separate control module 221 may be functionally connected to the control module 220 to perform the same function as the control module 220. In order to show security data to a user well, the separate control module 221 may arrange the display layer including the security data at the uppermost position or control the transparency thereof.

In an embodiment, the separate control module 221 may autonomously store security data therein for representing whether security is maintained. That is because the separate control module 221 may have a memory included therein. In addition, when a particular application is executed, the separate control module 221 may receive protected data and general data from the memory 210. In this case, the separate control module 221 may control the composing module 230 on its own (without the control of the control module 220) to compose the security data stored in the internal storage space of the separate control module 221 and the received protected data and general data.

The memory 210 may temporarily store protected data and general data as an application is executed. Accordingly, the memory 210 may store different processing methods according to the types of data such as the protected data and the general data. For example, the memory 210 may store a z value and an α value that are uniquely set for the protected data. The z value may be set to arrange display data based on the Z-axis. The α value may be set to adjust the transparency of display data. The z value and the α value may vary in a process of arranging display layers or in a process of adjusting the transparency of the display layers under the control of the separate control module 221.

The control module 220 may make a control such that the electronic device performs the overall operations thereof. In the embodiment illustrated in FIG. 2C, an operation of displaying a security screen may be performed by the separate control module 221.

For convenience of description, the display layer including the security data has been exemplified in the above-described embodiment. However, an application may also be made to display a 3D object including security data.

Figure 3A:
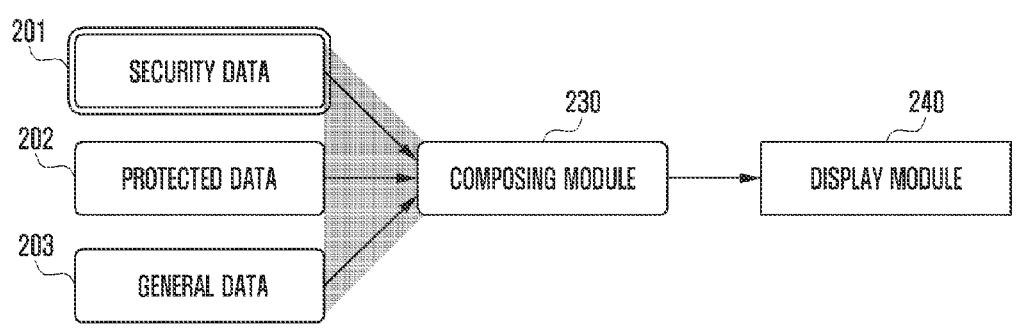
FIGS. 3A, 3B, and 3C illustrate examples of processing security data in an electronic device according to various embodiments of the present disclosure.
Figure 3B:
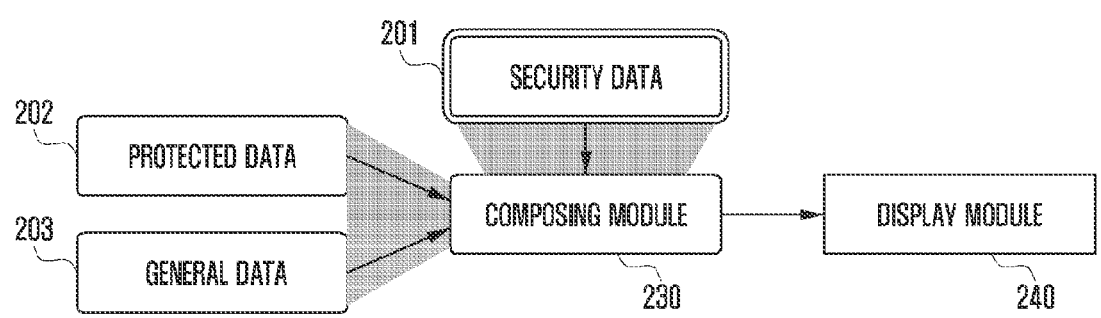
Figure 3C:
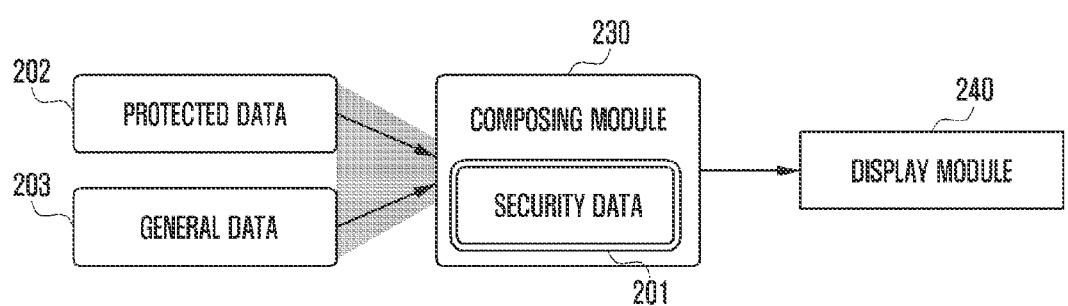

FIGS. 3A, 3B, and 3C illustrate examples of processing security data in an electronic device according to various embodiments of the present disclosure.

The control module 220, when a particular application is executed, may identify the types of display data. Here, the types of display data may include security data, protected data, and general data, and the display data may be a symbol, a mark, an icon, text, an identification sign, a color, or the like that is displayed on one or more display layers. In addition, the display data may be one or more 3D objects.

The control module 220 transfers a plurality of pieces of display data to the composing module 230 when displaying the display data, such as security data, protected data, and general data, on the display module 240. The composing module 230 may arrange the positions of the display layers including the received display data and/or adjust the transparency thereof under the control of the control module 220.

The composing module 230, when displaying screen data on the display module 240, may rearrange the positions of the display layers and/or adjust the transparency thereof under the control of the control module 220. The composing module 230 may compose the plurality of display layers including the plurality of pieces of display data into one screen. Even when displaying display layers in 3D, the composing module 230 may arrange a plurality of 3D objects based on the Z-axis to compose the same.

The display module 240 may display the screen received from the composing module 230 under the control of the control module 220, the screen being obtained by composing the plurality of display layers.

The display layer including the security data may be transmitted to the composing module through a physical address or software.

A method of transmitting security data to the composing module will be described below with reference to FIGS. 3A, 3B, and 3C. In addition, embodiments of composing a plurality of display layers into one screen and displaying the screen will be hereinafter described, each display layer including display data. However, in cases where a 3D screen is displayed, display layers may be 3D objects.

First, FIG. 3A illustrates an example of a method for loading a display layer including security data through the same processing path as other display layers.

Referring to FIG. 3A, the control module 220, when an application is executed, may transfer, to the composing module 230, display layers including security data 201, protected data 202, and general data 203, respectively. The control module 220, when transferring the display layer including the security data to the composing module 230, may transfer the display layer using the same path as the protected data and/or the general data.

In an embodiment, when executing a particular application, for example a bank application, the control module 220 may store, in a memory, general data 203 such as an icon of the bank application implemented by the bank application, protected data 202 such as a user's personal information, and security data 201 representing that security is maintained. As the bank application is executed, the control module 220 may transfer, to the composing module 230, the display layer including the security data 201 stored in the memory through the same path as the display layers including the protected data 202 and the general data 203, respectively.

Thereafter, the composing module 230 may arrange the position of the received display layer under the control of the control module 220. When adjusting the position of the display layer, if the display layer includes security data, the composing module 230 may arrange the display layer including the security data at the uppermost position.

Then, the composing module 230 may compose the plurality of display layers including the display data into one screen and display the screen on the display module 240 under the control of the control module 220. In this case, on the screen displayed through the display module 240, the security data for indicating whether security is maintained may be arranged and displayed on the uppermost display layer.

FIG. 3B illustrates an example of a method for loading a display layer including security data through a separate processing path.

Referring to FIG. 3B, the control module 220 may differentiate only a display layer including security data among a plurality of display layers using a separate physical address and then transfer the display layers to the composing module 230.

Since the composing module 230 may further include a second memory, the control module 220 may make a control to store the security data 201 in the separate memory. The control module 220, when a particular application is executed, may transfer the corresponding display data to the composing module 230. Here, the corresponding display data may be the security data 201, protected data 202, and general data 203. Since the security data 201 is stored in the separate memory, and the protected data 202 and the general data 203 are stored in the memory 210, the control module 220 may transfer, to the composing module 230, the display layer including the security data 201 through a different path from the display layers including the protected data 202 and the general data 203. Here, the second memory may be a region divided by a physical address or software.

The control module 220 may transfer, to the composing module 230, a plurality of display layers including one or more pieces of display data. Then, the composing module 230 may compose the plurality of received display layers into one screen under the control of the control module 220, and the control module 220 may control the display module 240 to display the screen obtained by composing the plurality of display layers.

FIG. 3C illustrates an example of a structure in which the composing module 230 has a separate storage space therein for processing a display layer including security data.

Referring to FIG. 3C, the composing module 230 may include the separate control module 221 which is separate from the existing control module 220.

In this state, as a particular application is executed, the separate control module 221 may make a control to transmit display data to the composing module 230 in order to display a screen on the display module 240.

The composing module 230 may have a space therein which is used only for processing the display layer including security data 201, which may substantially correspond to a state in which the separate control module 221 stores the security data. Accordingly, while the display layer including the security data 201 is stored in the composing module 230, the control module 220 may transfer, to the composing module 230, the display layers including protected layer 202 and general data 203, respectively. Then, the composing module 230 may compose the stored display layer including the security data 201 and the other display layers (the display layers including the protected data and the general data) into one screen under the control of the control module 220. Thereafter, the control module 220 may control the display module 240 to display the screen composed through the composing module 230.

The display module 240 may display the screen composed by the composing module 230 under the control of the control module 220.

As described above, the electronic device for outputting a security screen, according to the various embodiments of the present disclosure, may include the display module 240, the memory having at least one display data or at least one of a plurality of display layers loaded therein, the separate memory, the composing module 230 that arranges a plurality of display layers including the at least one display data or adjusts the transparency thereof, the control module that controls the display of the security screen through the display module 240, the memory, or the composing module 230, and the separate control module. The control module 220 may identify the type of at least one display data included in the display layers and transfer the display data corresponding to the identified type to the composing module 230 using a configured processing path. Through a path according to the structure of the electronic device, the control module 220 may transfer, to the composing module 230, a display layer including security data for representing that security is maintained.

For convenience of description, the display layer including the security data has been exemplified in the above-described embodiment. However, an application may also be made to display a 3D object including security data.

FIGS. 4A, 4B, 4C, and 4D illustrate examples of a method for processing a display layer including security data in the electronic device 101 according to various embodiments of the present disclosure.

Hereinafter, three types of security devices for processing a display layer including security data among display data will be described. Here, the security data may represent whether security is maintained and may ensure data integrity and data confidentiality. The following three types of security devices are only illustrative, and the present disclosure is not limited thereto. The security devices use the following methods to maintain confidentiality.

Figure 4A:
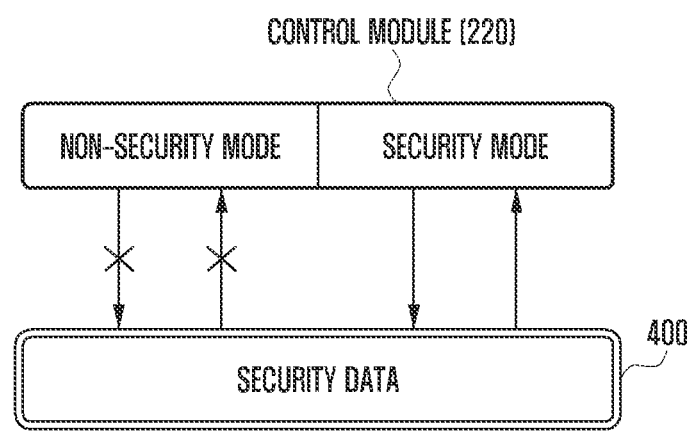
FIGS. 4A, 4B, 4C, and 4D illustrate examples of a method for processing security data in an electronic device according to various embodiments of the present disclosure.

FIG. 4A illustrates an example of a method in which the control module 220 operates a security mode in order to process a display layer including security data.

Referring to FIG. 4A, the control module 220 may access security data when operating in a security mode. Here, the security mode may correspond to a situation in which an API for executing a security function is called when a particular application is executed. For example, the security mode may correspond to a situation of including a display layer including protected data among a plurality of layers. The control module 220, when determining that the API for executing a security function is called, may make a control to operate in the security mode to access security data 400. Here, the control module 220 may have access authority configured to access the security data. For example, a security mode provided by hardware corresponding to the control module 220 may be Trust Zone of ARM. The Trust Zone of ARM may use a hardware security function such as a Trusted Execution Environment (TEE, a type of control module). The control module 220 may configure authority by which the Trust Zone can access the security data 400 and may make a configuration such that a display layer operating in a non-security mode cannot identify the thing which the Trust Zone processes.

For example, when a command "read ( );" for configuring access authority is called, the control module 220 may configure access authority. In addition, the control module 220 may process security data through a process accessible to the security data.

In an embodiment, the control module 220 may control a plurality of display layers displayed on a screen to operate in the security or non-security mode according to display data included in the display layers. For example, the control module 220 may control display layers including security data and protected data to operate in the security mode and configure authority to allow a display layer including general data to operate in the non-security mode. Such a situation may be determined depending on whether protected data is included in the plurality of display layers. Accordingly, the control module 220 may grant access authority to the security data 400 only to the display layers operating in the security mode.

The process accessible to security data may be a process generated in the security mode or a process generated in a security mode of software. In this case, the control module 220 makes a control such that it cannot be identified in the non-security mode to process security data in the security mode.

Figure 4B:
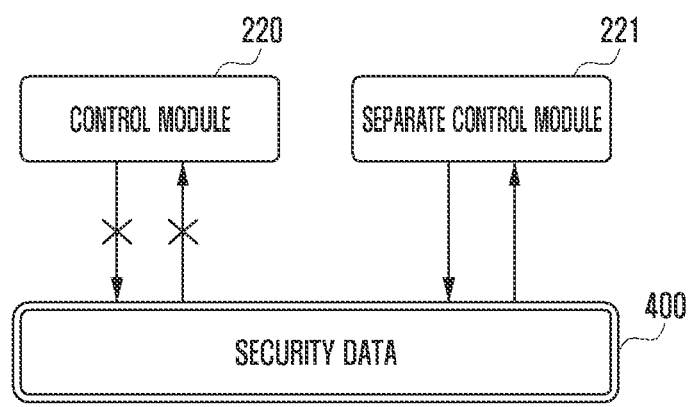

FIG. 4B illustrates an example of a method for using a separate control module as separate hardware for processing security data. The separate control module 221, which is a control module of separate hardware, may access a display layer including security data 400. The separate control module 221, which is the control module of the hardware, existing separately from the control module 220 which is the existing control module may access the security data 400.

In an embodiment, the existing control module 220 may configure access authority to the security data 400 such that only the separate control module 221 can access the security data 400.

In an embodiment, access authority may be configured such that the separate control module 221 configured to be separate from the existing control module 220 can access the security data 400.

Accordingly, the control module which does not have access authority cannot identify that the separate control module having the access authority to the security data processes the security data.

Figure 4C:
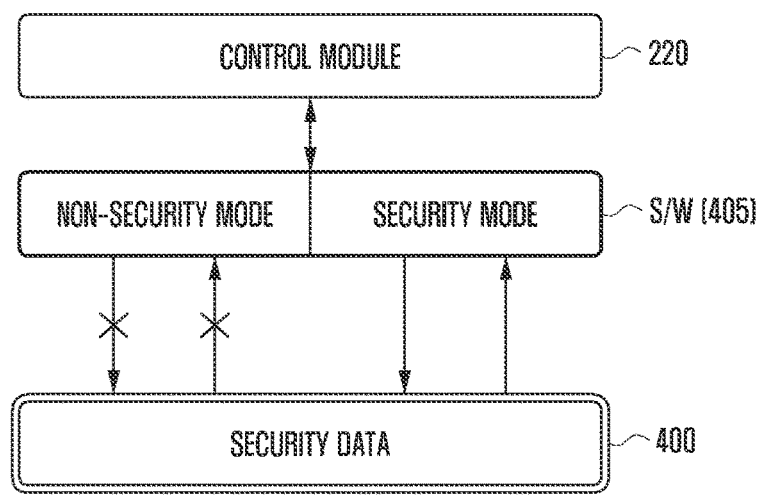

In another embodiment, security data may be processed through separate software as illustrated in FIG. 4C. FIG. 4C illustrates an example of a method for processing security data using separate software 405 at the same time as using the existing hardware including the existing control module 220 as it is. As illustrated in FIG. 4C, the control module 220 may process the security data through the separate software 405. That is, only the separate software 405 may have access authority to the security data 400. In this case, although the separate software 405 has the access authority to the security data in a security mode, the separate software 405 has no access authority to the security mode in a non-security mode. In addition, the control module 220 may use the existing hardware as it is and process the security data through the separate software. Accordingly, protected data and general data may be transferred to the composing module through the existing hardware, and the security data may be transferred to the composing module through the separate software at the same time. In this case, according to a configuration, a display layer including the security data may use an independent operating system. Furthermore, the display layer including the security data may simply regulate the access of the non-security mode.

Figure 4D:
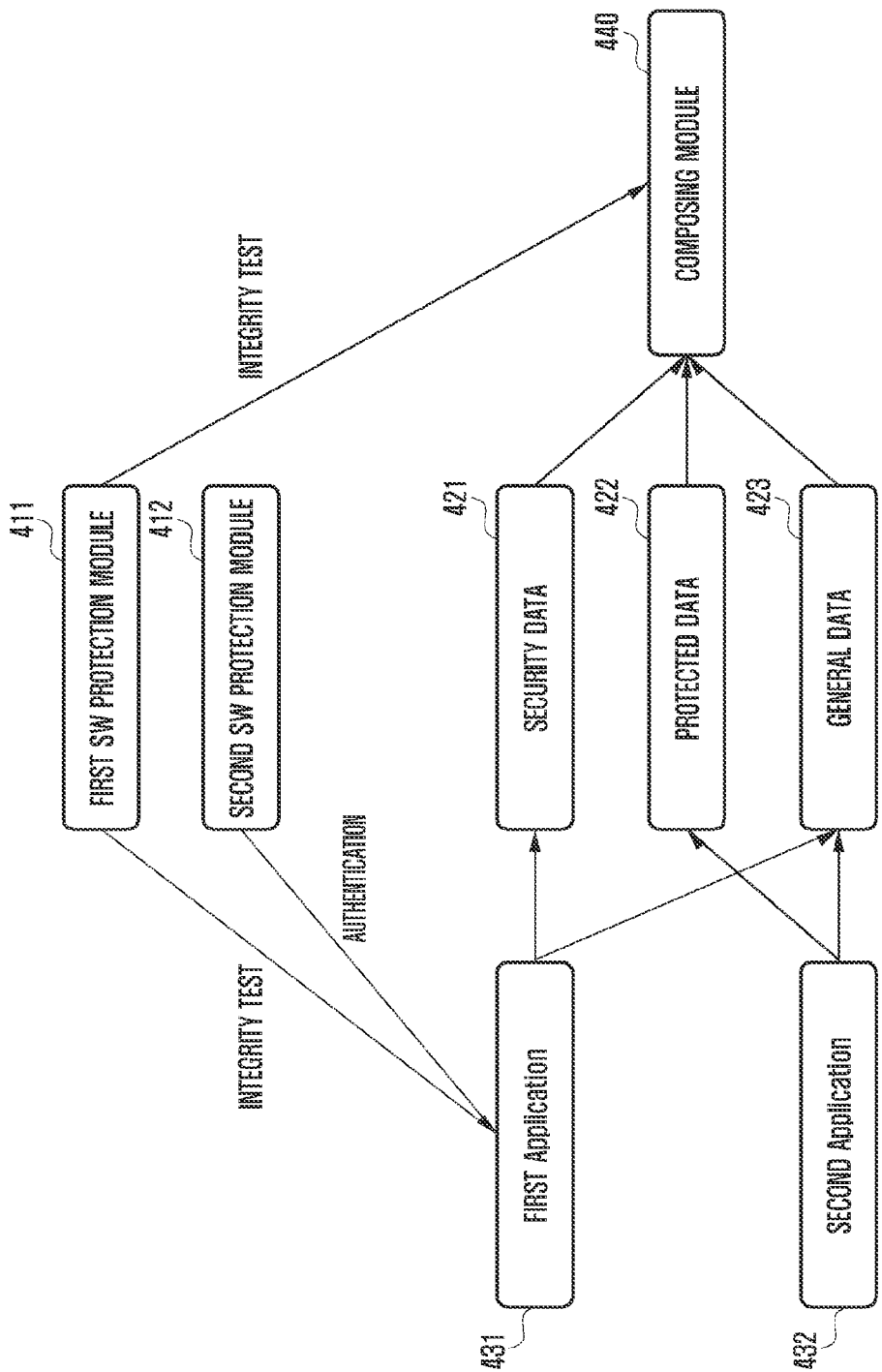

FIG. 4D illustrates an example of a method for processing a display layer including security data using a software protection module.

Referring to FIG. 4D, the control module 220 may include one or more software protection modules 411 and 412. The software protection modules 411 and 412 may conduct authentication and a data integrity test for display data (security data 421, protected data 423, and general data 423) that will be displayed on a screen as an application is executed. The software protection modules 411 and 412 may simultaneously conduct the authentication and the data integrity test, or may conduct only the authentication or only the data integrity test. The authentication of the display data is a process of identifying that the display data may be displayed on a screen by the software protection module. The data integrity test is a process in which the software protection module checks whether the display data is contrary to data integrity.

In an embodiment, a bank application is assumed to be executed. In this situation, the control module 220 may execute a plurality of applications necessary for executing the bank application. For description of the disclosure, security keypad application 431 and a bank UI display application 432 are assumed to be necessary for executing the bank application. The security data 421 and the general data 423 may be included in a plurality of display layers for displaying the security keypad application 431. In addition, the protected data 422 and the general data 423 may be included in a plurality of display layers for displaying the bank UI display application 432. Accordingly, the software protection modules 411 and 412 may conduct a data integrity test and an authentication test for the security data 421, the protected data 422, and the general data 423 which are included in a plurality of display layers displayed on a screen when the bank application is executed. Thereafter, the control module 220 may transfer, to a composing module 440, the display data for which the data integrity test and the authentication test have been conducted.

In an embodiment, the software protection modules 411 and 412 may conduct a data integrity test and an authentication test for display data stored in the screen composing module 440.

Furthermore, in an embodiment, the software protection modules 411 and 412 may conduct a data integrity test and an authentication test for display data received by the screen composing module 440.

The composing module 440, when receiving the plurality of pieces of display data, may compose the received display data into one screen. In this case, the screen composing module 440 may arrange the display layer including the security data 421 (e.g., a security keypad) at the uppermost position and then compose the plurality of display layers under the control of the control module 220. The composing module 440 may transfer the composite screen to the display module under the control of the control module 220.

When the composing module 440 transfers the composite screen to the display module, the control module may display the screen by controlling the attribute of the security data, displayed on the uppermost layer, according to whether protected data is included in the composite screen. Here, the attribute of the display data may be an attribute configured to arrange the display layer at the uppermost position based on the Z-axis or opaquely display the display layer.

In an embodiment, when the protected data is included in the composite screen, the control module may display, on the uppermost layer, the security data in the form of representing that security is maintained.

In an embodiment, when the protected data is not included in the composite screen, the control module may display, on the uppermost layer, the security data in the form of representing that security is released.

For convenience of description, the display layer including the security data has been exemplified in the above-described embodiment. However, an application may also be made to display a 3D object including security data.

Figure 5:
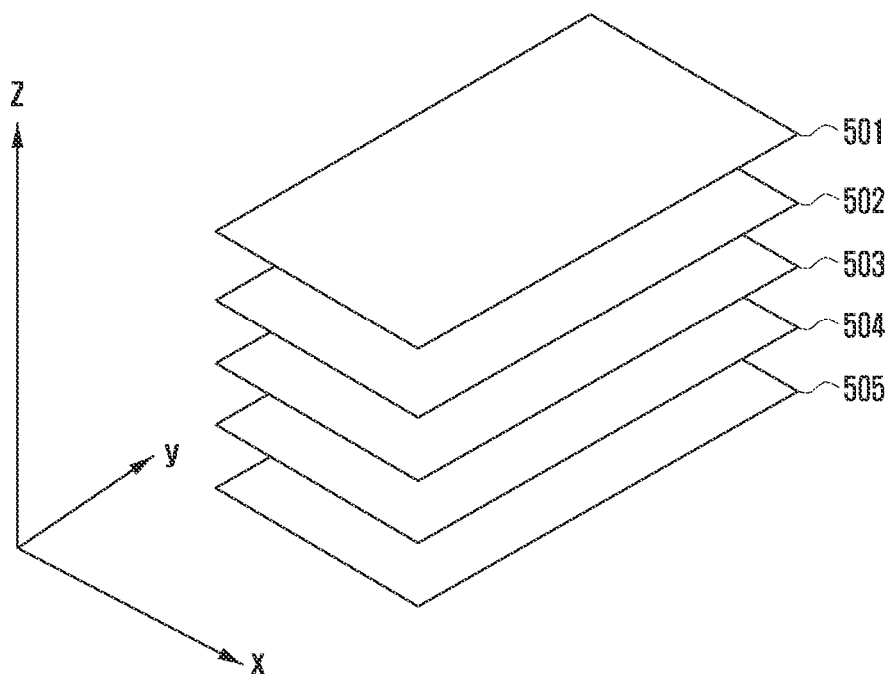
FIG. 5 illustrates an example of a display layer structure according to various embodiments of the present disclosure.

FIG. 5 illustrates an example of a display layer structure according to various embodiments of the present disclosure.

Referring to FIG. 5, a plurality of display layers (x, y) 501 to 505 may be arranged based on the Z-axis. Furthermore, in a 3D screen, display layers may mean 3D objects. The display layers may include one or more pieces of display data, and the display data may be security data, protected data, or general data. One display layer has an arbitrarily set size in a plane defined by X and Y axes. In addition, one or more display layers of one application are arranged along the Z-axis. The control module 220 may compose the display layers, arranged along the Z-axis, into one screen and display the composite screen through the composing module 230.

As one or more applications are executed, the number of display layers of each application may increase. In this case, the electronic device 101 may arrange the one or more display layers based on the Z-axis. If the plurality of display layers includes protected data and security data is accordingly included, the control module 220 may arrange the security data at the uppermost position, compose the plurality of display layers into one screen, and display the composite screen. Therefore, the security data may always be shown to a user.

Figure 6:
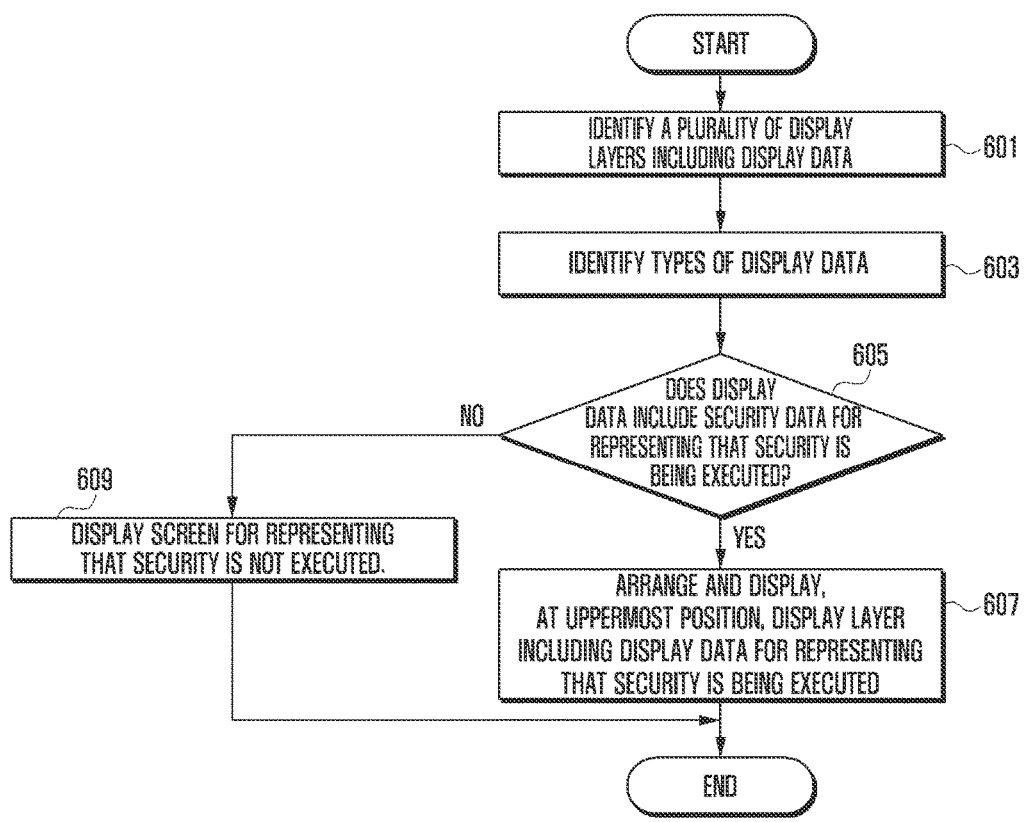
FIG. 6 is a flowchart illustrating a procedure of arranging display layers according to various embodiments of the present disclosure.
Figure 7A:
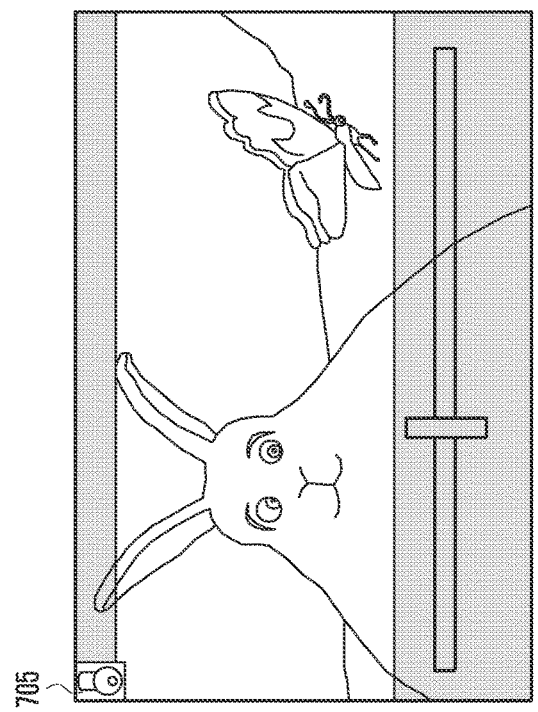
FIGS. 7A and 7B illustrate examples of displaying a security screen according to various embodiments of the present disclosure.
Figure 7A:
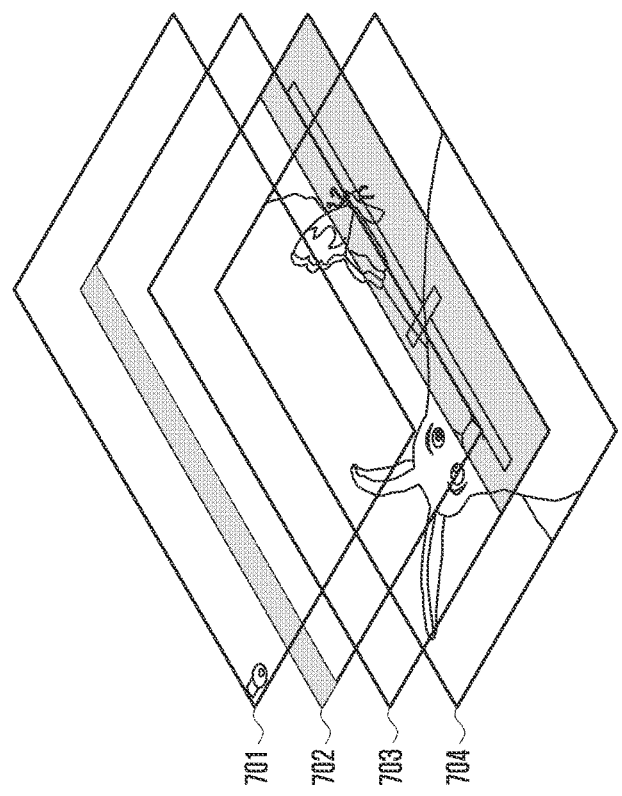
Figure 7B:
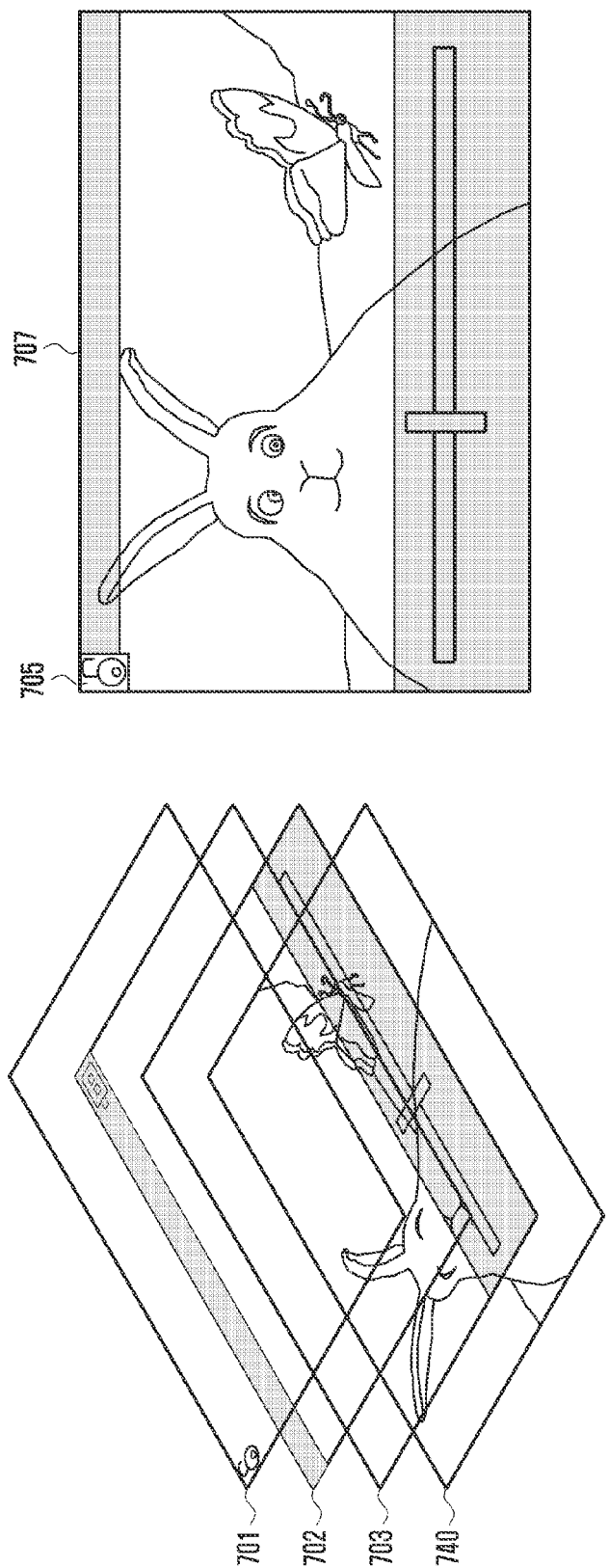
Figure 8:
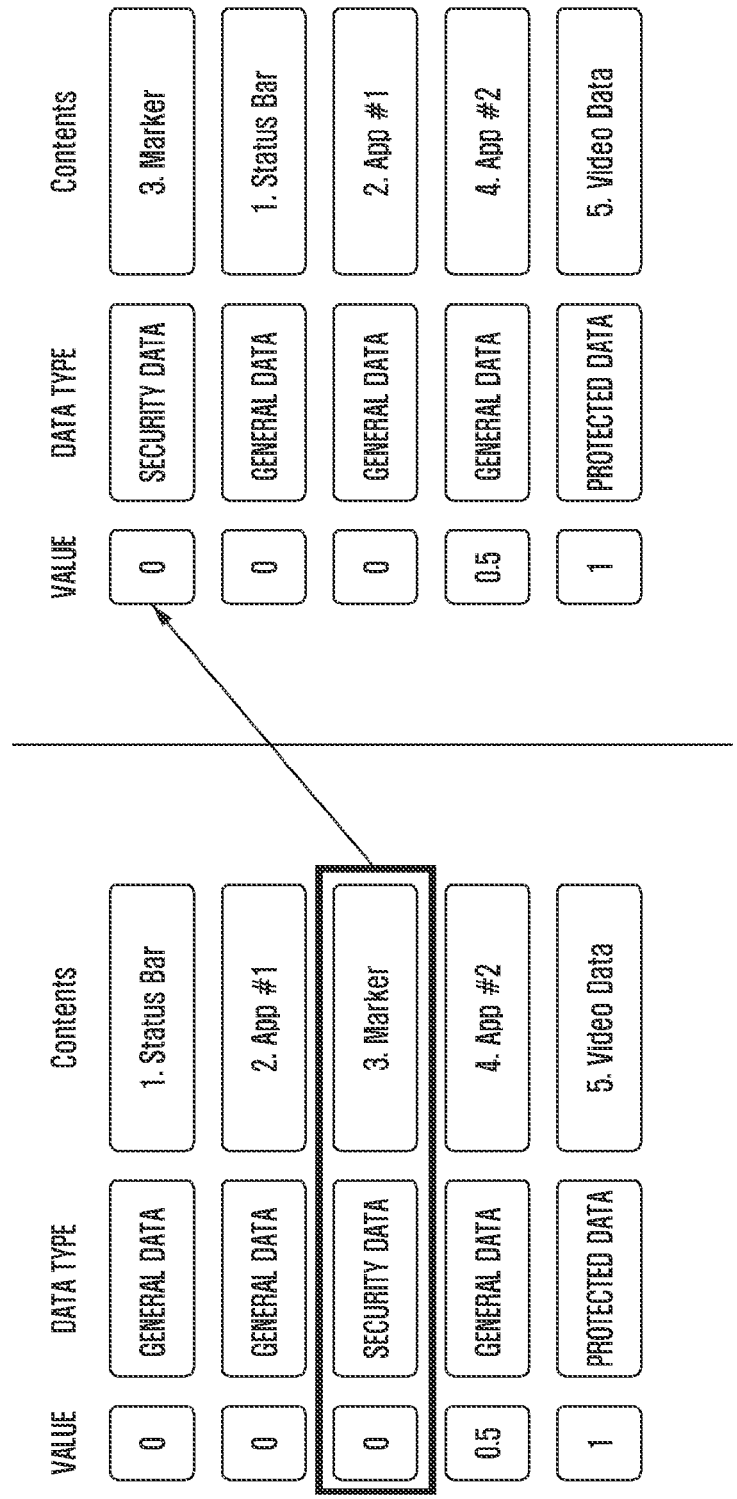
FIG. 8 illustrates an example of a method for arranging display layers according to various embodiments of the present disclosure.

FIG. 6 is a flowchart illustrating a procedure of arranging a plurality of display layers according to various embodiments of the present disclosure. FIGS. 7A and 7B illustrate examples of displaying a security screen according to various embodiments of the present disclosure. FIG. 8 illustrates an example of a method for arranging a plurality of display layers according to various embodiments of the present disclosure.

A method of arranging a plurality of display layers, according to an embodiment of the present disclosure, will be described with reference to FIGS. 6, 7A, 7B, and 8.

The control module 220 may transfer a plurality of display layers to the composing module 230 as an application is executed. The method of transferring the display layers to the composing module 230 has been described above with reference to FIGS. 3A, 3B, and 3C.

In an embodiment, a display layer including security data may be transferred to the composing module 230 through the same path as display layers including protected data and general data.

In an embodiment, the display layer including the security data may be transferred to the composing module 230 through a different path from the display layers including the protected data and the general data.

In an embodiment, while the display layer including the security data is stored in the composing module, the display layers including the protected data and the general data are transferred to the composing module 230.

When the plurality of display layers are transferred to the composing module 230, the control module 220 may, in operation 601, identify the plurality of display layers including the display data as the application is executed. The application execution screen may be configured with the plurality of display layers.

FIG. 7A illustrates examples of display layers constituting a video application execution screen. One screen displayed on the display module 240 may be in a state in which a plurality of display layers 701, 702, 703, and 704 are composed into one screen as illustrated in FIG. 7A.

In operation 603, the control module 220 may identify the types of display data included in the display layers. The types of display data may include security data, protected data, and general data. In operation 605, the control module 220 may determine whether the display data includes security data for representing that the security is being executed. Based on whether the plurality of pieces of display data includes the protected data, the control module 220 may identify that the security is being executed.

Referring to FIG. 7A, a case of displaying a charged video as the video application is executed may correspond to a state of representing that security is being executed.

The display layer 704 may include protected data that is a charged video file. The display layers 703 and 702 may include general data that is necessary for executing the video application and is freely displayed in terms of security. For example, a status bar that is general data may be displayed on the display layer 702, and a slide bar that is general data may be displayed on the display layer 703. The display layer 701 may display an icon 705 (e.g., a closed lock), which is security data, at the uppermost position in a region thereof. Here, the icon 705 may be, for example, information for representing that the application is a charged video file.

The control module 220 may display the security data 705 on the entire or partial region of the display layer 701 to indicate that security is maintained for the display layer 701. The security data may be displayed with text or a mark. For example, the security data may be the security data 705 displayed with a mark, such as a lock on the display layer 701, or may be displayed with text "Security is maintained."

As described above, the application execution screen may be configured with one or more display layers.

In an embodiment, the control module 220, when a particular application (e.g., a bank application) is executed, may recognize that protected data (e.g., a password or personal information) and general data (e.g., a UI such as an icon) are among display data displayed on a plurality of display layers. In response to the recognition of the existence of the protected data, the control module 220 may display the security data (e.g., an icon, such as a lock, or text) in the form of representing that security is being executed (e.g., a closed lock or text "Security is being executed."). In this case, the security data may be in a state of being authenticated through a data integrity test and a data confidentiality test to prevent the security data from being hacked into. Such security data may be arranged to be always located at the uppermost position.

Meanwhile, when recognizing that there is no protected data among the display data displayed on the plurality of display layers, the control module 220 may display the security data (e.g., an icon, such as a lock, or text) in the form of representing that a security function is not executed (e.g., an open lock or the text "Security is not executed."). Such security data may be arranged to be always located at the uppermost position. When malware displays a fake screen in such a situation as if security is being executed, the control module 220 may display a screen into which the form of representing that the security function is not being executed (e.g., the open lock or the text "Security is not executed.") is composed. Therefore, a user can recognize that a security problem arises.

When the display data includes the security data for representing that security is maintained, the composing module 230 may arrange the display layer including the security data at the uppermost position under the control of the control module 220 in operation 607. Here, the security data that ensures data integrity and data confidentiality always has to be displayed on the uppermost layer since the security data always has to be shown to a user.

In an embodiment, even though the number of display layers increases with the execution of a plurality of applications, the composing module 230 may always arrange the display layer including the security data at the uppermost position.

FIG. 8 illustrates an example of a method for arranging display layers according to various embodiments of the present disclosure.

Referring to FIG. 8, if a display layer including security data is located in the third position, the composing module 230 may arrange the display layer including the security data at the uppermost position under the control of the control module 220.

Meanwhile, when the determination result in operation 605 shows that the display data does not include the security data for representing that security is being executed, the composing module 230 may display a screen for representing that security is not executed under the control of the control module 220 in operation 609. The execution or non-execution of security may be determined according to whether a display layer including protected data is among the plurality of display layers. Even in this case, the screen is configured with the plurality of display layers, and the composing module 230 may therefore compose the plurality of display layers into one screen.

Referring to FIG. 7B, the control module 220, as executing a particular application, may recognize that a security function is not executed for display data included in a plurality of display layers. The control module 220, when protected data is not displayed, may recognize that the security function is not executed. For example, the situation that the security function is not executed may correspond to a situation of executing a free video.

For example, security data 705 (an open lock) may be displayed as in a screen 707 of FIG. 7B. This helps a user recognize that the security is released (the free video is displayed). In this situation, a display layer 740 may include general data (e.g., free video content), a display layer 702 may include a status bar that is general data, and a display layer 703 may include a slide bar that is general data. That is, the control module 220 may display the security data 705 on the uppermost display layer 701 in order to represent that the application is a free video (e.g., to represent the open lock). The control module 220 may make an arrangement to display the layer 701 including the security data 705 at the uppermost position. When the control module 220 is attacked by malware while displaying the security data 705 for representing that the application is a free video, display data faked by the malware as if the application is a charged video and the security data 705 displayed by the control module 220 to represent that the application is a free video may be displayed to overlap each other. Here, the security data may be displayed with an effect added thereto through a symbol, a mark, an icon, text, an identification sign, a color, or the like. For example, the control module 220 may be attacked by the malware while displaying the security data indicating the free video in blue. At this time, the malware may display the fake display data in blue as if the application is a charged video. In this situation, since the control module 220 displays a color red, red and blue are displayed together so that a user can identify them.

As described above, the method of outputting a security screen of an electronic device according to the various embodiments of the present disclosure may include identifying a plurality of display layers including at least one display data, identifying the type of the at least one display data, and arranging, at the uppermost position, the display layer including display data corresponding to a designated type based on at least the identified type.

Figure 9:
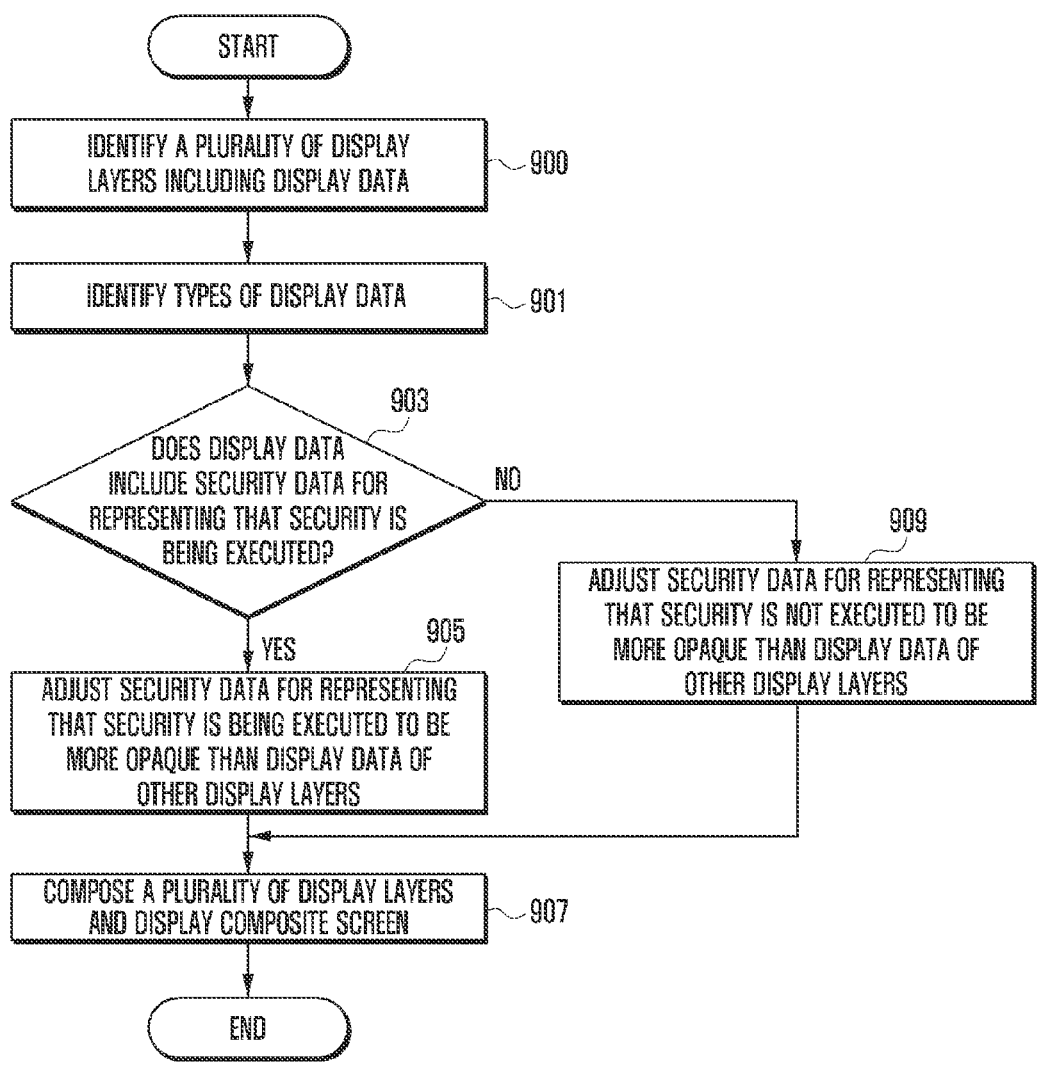
FIG. 9 is a flowchart illustrating a procedure of opaquely displaying a display layer according to various embodiments of the present disclosure.

FIG. 9 is a flowchart illustrating a procedure of opaquely displaying a display layer according to various embodiments of the present disclosure. FIG. 10 illustrates an example of a method for opaquely displaying a display layer according to various embodiments of the present disclosure.

The control module 220, when displaying a screen with the execution of a particular application, may transfer a plurality of display layers constituting the screen to the composing module 230. Specifically, the control module 220 may transfer display data included in the display layers to the composing module 230.

FIGS. 3A, 3B, and 3C will be referred to for a method of transferring the display layers including the display data to the composing module 230.

In an embodiment, a display layer including security data may be transferred to the composing module 230 through the same path as display layers including protected data and general data.

In an embodiment, the display layer including the security data may be transferred to the composing module 230 through a different path from the display layers including the protected data and the general data.

In an embodiment, while the display layer including the security data is stored in the composing module, the display layers including the protected data and the general data may be transferred to the composing module 230.

When the plurality of display layers are transferred to the composing module 230, the control module may identify the plurality of display layers including the display data in operation 900. The screen displayed when the particular application is executed may be configured with the plurality of display layers.

In operation 901, the control module 220 identifies the types of display data. Here, the types of display data may include security data, protected data, and general data. The security data, which is information ensuring data integrity and data confidentiality, may represent whether a security function is executed and may be stored in the memory. In operation 903, the control module 220 may determine whether the display data to display on the screen includes security data for representing that security is being executed. When determining that the display data includes the security data for representing that security is being executed, the control module 220 may opaquely display the security data and adjust protected data and general data to be transparent in operation 905. The composing module 230 may adjust the security data to be always opaque under the control of the control module 220. In operation 907, the composing module 230 may compose the plurality of display layers into one screen and display the composite screen.

In an embodiment, the control module 220 may execute a security function as an application requiring security is executed. When executing the security function, the control module 220 may opaquely display an icon (e.g., a closed lock) for which the security function is being executed, thereby displaying that a security state is maintained.

FIG. 10 illustrates an example of a method for opaquely displaying display data of a display layer according to various embodiments of the present disclosure.

Referring to FIG. 10, it is assumed that one screen is configured with five display layers. Here, the five display layers have unique alpha values and are displayed with transparency corresponding to the alpha values, respectively. The alpha values may vary between 0 and 1 with the adjustment of transparency. An alpha value of 0 represents a transparent state, and an alpha value of 1 represents an opaque state. The composing module 230 may opaquely display only a display layer including security data by setting the alpha value thereof to 1 and may transparently display display layers including protected data or general data by setting the alpha value thereof to 0. Then, the composing module 230 may opaquely display only the display layer including the security data having the alpha value set to 1, thereby showing a user the display layer.

When it is determined in operation 903 that the display data to be displayed on the screen does not include the security data for representing that security is being executed, the composing module 230 controls the security data to display a screen for which security is not executed under the control of the control module 220 in operation 909.

That is, the control module 220 may display the security data to be more opaque than the display data included in the other display layers. At this time, the displayed security data may be displayed in a form of representing that security is not executed. For example, the security data may be displayed with the text "Security is not executed." At the same time, the control module 220 may display the general data to be more transparent than the security data.

In an embodiment, the control module 220 may determine that, as a running application displays only general data, a security API is not called and a security function is not therefore executed.

Figure 11:
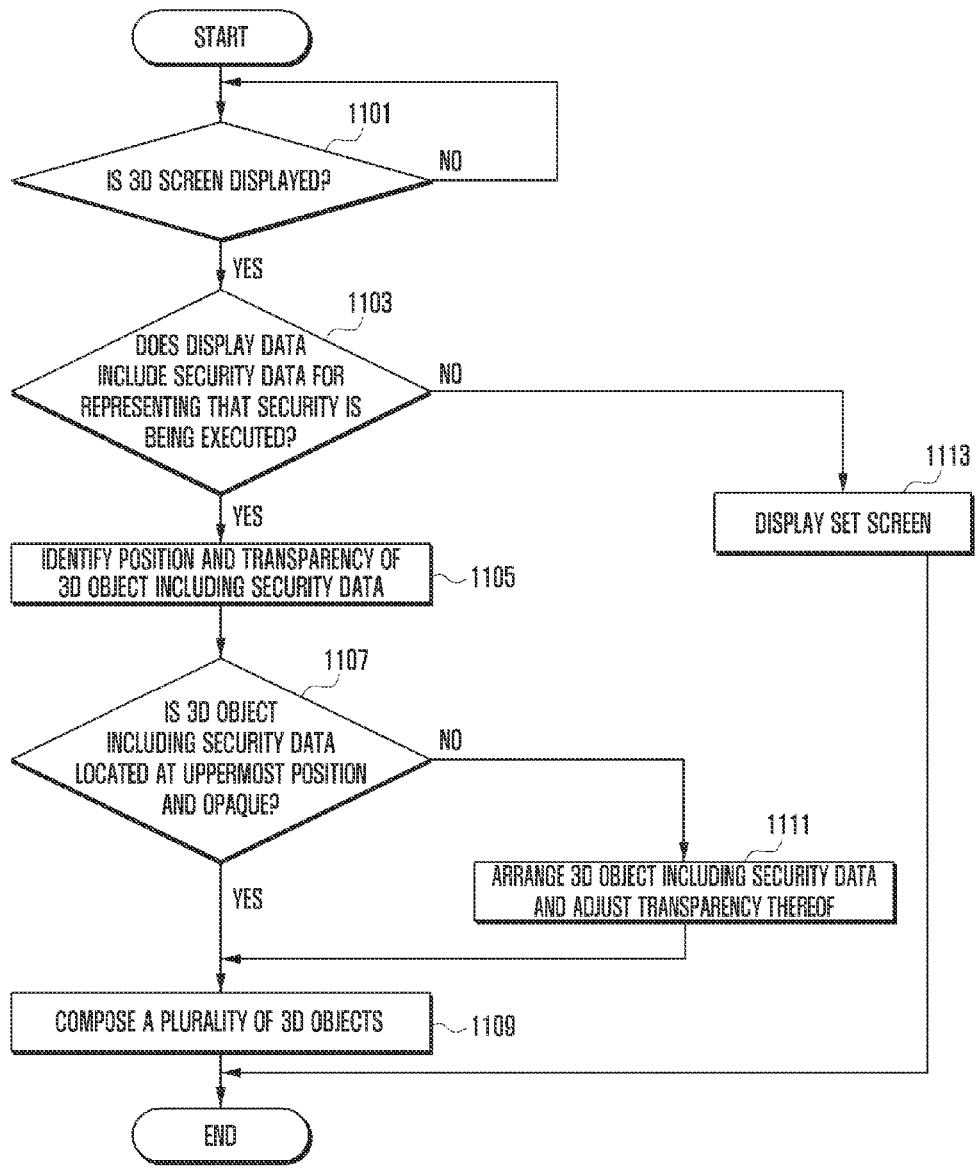
FIG. 11 is a flowchart illustrating a method of arranging display layers according to various embodiments of the present disclosure.
Figure 12A:
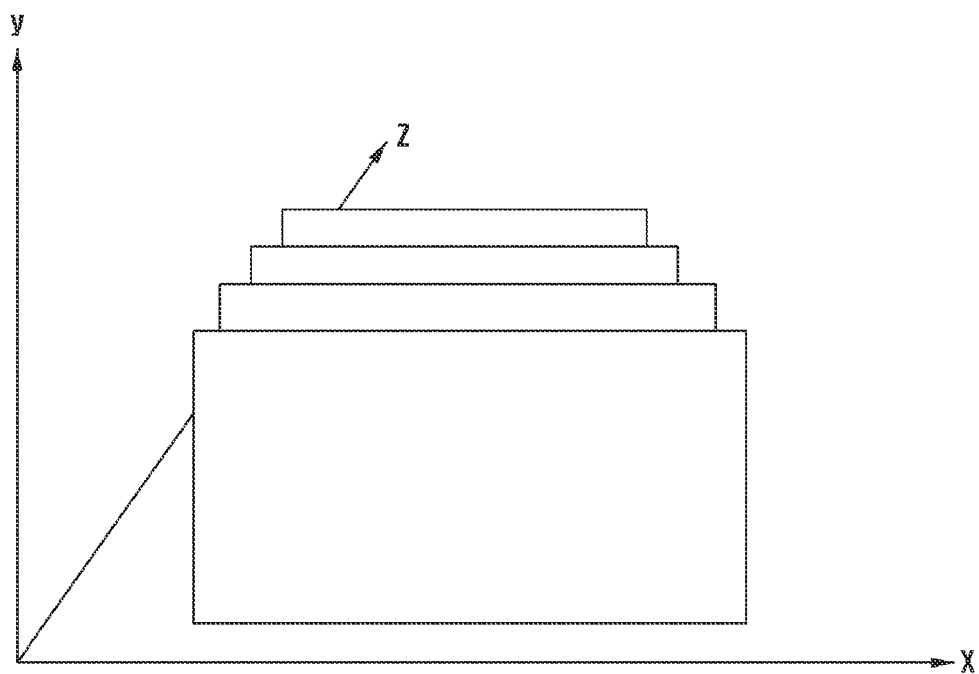
FIGS. 12A and 12B illustrate examples of displaying display layers in 3 dimensions (3D) according to various embodiments of the present disclosure.
Figure 12B:
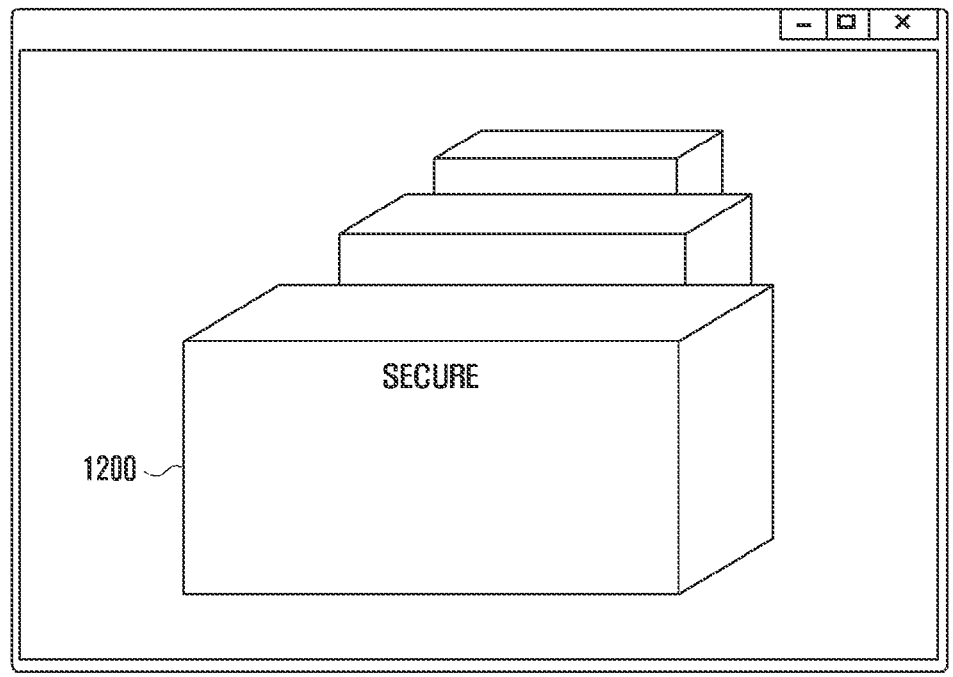

FIG. 11 is a flowchart illustrating a method of arranging 3D objects according to various embodiments of the present disclosure. FIGS. 12A and 12B illustrate an example of displaying 3D objects according to various embodiments of the present disclosure.

The control module 220, when displaying a screen, may transfer a plurality of 3D objects to the composing module 230. A method of transferring the 3D objects to the composing module 230 may be performed through the procedure illustrated in FIGS. 3A, 3B, and 3C.

In an embodiment, a 3D object including security data may be transferred to the composing module 230 through the same path as 3D objects including protected data and general data.

In an embodiment, the 3D object including the security data may be transferred to the composing module 230 through a different path from the 3D objects including the protected data and the general data.

In an embodiment, while the 3D object including the security data is stored in the composing module, the 3D objects including the protected data and the general data may be transferred to the composing module 230.

The control module 220 may transfer the plurality of 3D objects to the composing module 230 and control the composing module 230 to compose the 3D objects. Accordingly, in operation 1101, the control module 220 determines whether the displayed screen is a 3D screen. When determining that the 3D screen is displayed, the control module 220 may, in operation 1103, determine whether display data included in the 3D screen includes security data for representing that security is being executed. Here, one or more 3D objects may be configured. When it is determined that the 3D objects include the security data, the composing module 230 may identify the positions and the transparency of the 3D objects under the control of the control module 220 in operation 1105. Here, the positions of the 3D objects mean positions arranged based on the Z-axis. The 3D screen may be differently displayed depending upon the positions and the transparency values of the 3D objects. That is, even though the 3D objects have the same Z value, the screen may be differently displayed depending on a difference in transparency. In operation 1107, the composing module 220 determines whether the 3D object including the security data is located at the uppermost position and hidden by the other display layers and/or 3D objects.

Referring to FIG. 12A, display layers having an arbitrarily set size in a plane defined by X and Y axes are arranged along the Z-axis. When a 3D screen is displayed in three dimensions as illustrated in FIG. 12B, the composing module 230 determines whether a 3D object 1200 including security data is located at the uppermost position and hidden by other 3D objects.

When determining that the 3D object 1200 including the security data is located at the uppermost position and not hidden by the other 3D objects, the control module 220 may compose the 3D objects into one screen and display the composite screen using the composing module 230 in operation 1109. When determining that the 3D object including the security data is not on the uppermost layer or is hidden by the other 3D objects, the composing module 230 may arrange the 3D object including the security data at the uppermost position and adjust the transparency thereof to be opaque at the same time in operation 1111. The composing module 230 may arrange the positions of the 3D objects and adjust the transparency thereof to make the 3D object including the security data located at the uppermost position and not hidden by the other 3D objects.

As described above, the control module 220 transfers the plurality of 3D objects to the composing module 230. The control module 220 may adjust the positions and the transparency of the plurality of 3D objects and compose the same through the composing module 230. When the control module 220 composes the plurality of 3D objects, if the 3D objects include a 3D object including security data, the control module 220 may arrange the 3D object at the uppermost position or opaquely display the same through the composing module 230. Here, the security data may be data that ensures data integrity and data confidentiality. Due to this, the control module 220 may always display the 3D object including the security data to a user. Also, when it is determined that the display objects of the 3D screen do not include security data in operation 1103, the composing module 230 may display according to user settings in operation 1113.

As described above, display data may be more finely classified in the present disclosure than in the existing method of classifying display data into protected data and general data. That is, in the present disclosure, display data that has to be protected may be classified into security data, protected data, and general data. Due to this, it is possible to flexibly arrange display layers including display data and to stably maintain a security screen by displaying a display layer including security data at the uppermost position and opaquely displaying the same.

Figure 13:
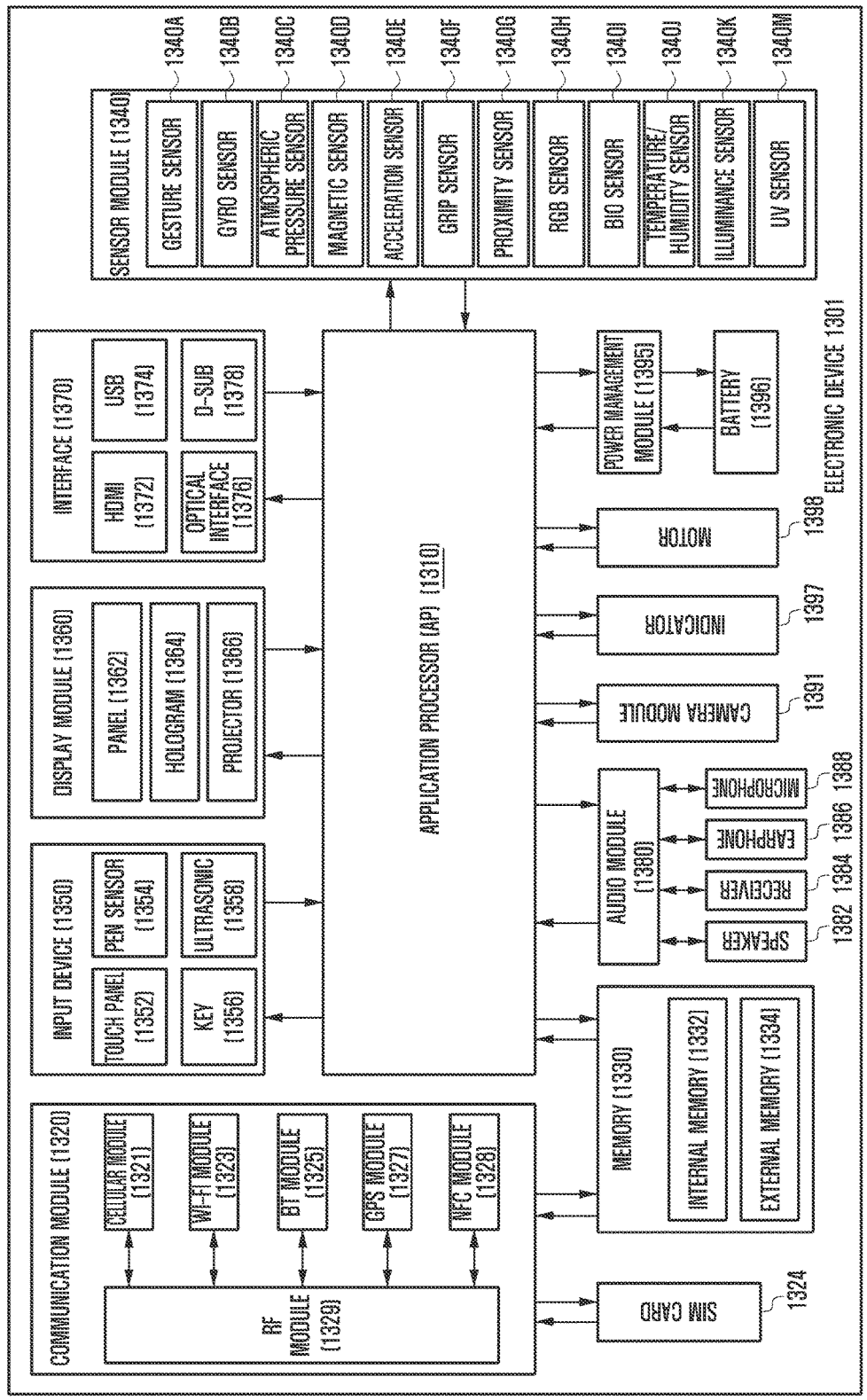
FIG. 13 is a block diagram of an electronic device according to various embodiments of the present disclosure.

FIG. 13 is a block diagram illustrating a configuration of the electronic device according to various embodiments of the present disclosure. The electronic device 1301 may be of the whole or a part of the electronic device 101. Referring to FIG. 13, the electronic device 1301 may include an Application Processor (AP) 1310, a communication module 1320, a Subscriber Identity Module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may operate an Operating System (OS) and/or application programs to control a plurality of hardware and/or software components connected to the AP 1310 and perform data-processing and operations on multimedia data. For example, the AP 1310 may be implemented in the form of System on Chip (SoC). According to an embodiment, the AP 1310 may include a Graphic Processing Unit (GPU) (not shown).

The communication module 1320 (e.g. communication interface 160) may perform data communication with other electronic devices (e.g. electronic device 104 and server 106) through a network. According to an embodiment, the communication module 1320 may include a cellular module 1321, a Wi-Fi module 1323, a BT module 1325, a GPS module 1327, an NFC module 1328, and a Radio Frequency (RF) module 1329.

The cellular module 1321 is responsible for voice and video communication, text messaging, and Internet access services through a communication network (e.g. LTE, LTE-A, CDMA, WCDMA, UMTS, WiBro, and GSM networks). The cellular module 1321 may perform identification and authentication of electronic devices in the communication network using the SIM card 1324. According to an embodiment, the cellular module 1321 may perform at least one of the functions of the AP 1310. For example, the cellular module 1321 may perform at least a part of the multimedia control function.

According to an embodiment, the cellular module 1321 may include a Communication Processor (CP). The cellular module 1321 may be implemented in the form of SOC. Although the cellular module 1321 (e.g. communication processor), the memory 1330, and the power management module 1395 are depicted as independent components separated from the AP 1310, the present disclosure is not limited thereto but may be embodied in a way that the AP includes at least one of the components (e.g. cellular module 1321).

According to an embodiment, each of the AP 1310 and the cellular module 1321 (e.g. communication processor) may load a command or data received from at least one of the components on a non-volatile or volatile memory and process the command or data. The AP 1310 or the cellular module 1321 may store the data received from other components or generated by at least one of other components in the non-volatile memory.

Each of the Wi-Fi module 1323, the BT module 1325, the GPS module 1327, and the NFC module 1328 may include a processor for processing the data it transmits/receives. Although the cellular module 1321, the Wi-Fi module 1323, the BT module 1325, the GPS module 1327, and the NFC module 1328 are depicted as independent blocks, at least two of them (e.g. communication processor corresponding to the cellular module 1321 and Wi-Fi processor corresponding to the Wi-Fi module 1323) may be integrated in the form of SoC.

The RF module 1329 is responsible for data communication, e.g. transmitting/receiving RF signals. Although not depicted, the RF module 1329 may include a transceiver, a Power Amp Module (PAM), a frequency filter, and a Low Noise Amplifier (LNA). The RF module 1329 also may include the elements for transmitting/receiving electric wave in free space, e.g. conductor or conductive wire. Although FIG. 13 is directed to the case where the Wi-Fi module 1323, the BT module 1325, the GPS module 1327, and the NFC module 1328 are sharing the RF module 1329, the present disclosure is not limited thereto but may be embodied in a way that at least one of the Wi-Fi module 1323, the BT module 1325, the GPS module 1327, and the NFC module 1328 transmits/receives RF signals an independent RF module.

The SIM card 1324 may be designed so as to be inserted into a slot formed at a predetermined position of the electronic device. The SIM card 1324 may store unique identity information (e.g. Integrated Circuit Card Identifier (ICCID)) or subscriber information (e.g. International Mobile Subscriber Identity (IMSI)).

The memory 1330 (e.g. memory 130) may include at least one of the internal memory 1332 and an external memory 1334. The internal memory 1332 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, Not AND (NAND) flash memory, and Not OR (NOR) flash memory).

According to an embodiment, the internal memory 1332 may be a Solid State Drive (SSD). The external memory 1334 may be a flash drive such as Compact Flash (CF), Secure Digital (SD), micro-SD, Mini-SD, extreme Digital (xD), and Memory Stick. The external memory 1334 may be connected to the electronic device 1301 through various interfaces functionally. According to an embodiment, the electronic device 1301 may include a storage device (or storage medium) such as hard drive.

The sensor module 1340 may measure physical quantity or check the operation status of the electronic device 1301 and convert the measured or checked information to an electric signal. The sensor module 1340 may include at least one of gesture sensor 1340A, Gyro sensor 1340B, atmospheric pressure sensor 1340C, magnetic sensor 1340D, acceleration sensor 1340E, grip sensor 1340F, proximity sensor 1340G, color sensor 1340H (e.g. Red, Green, Blue (RGB) sensor), bio sensor 1340I, temperature/humidity sensor 1340J, illuminance sensor 1340K, and Ultra Violet (UV) sensor 1340M. Additionally or alternatively, the sensor module 1340 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 1340 may further include a control circuit for controlling at least one of the sensors included therein.

The input device 1350 may include a touch panel 1352, a (digital) pen sensor 1354, keys 1356, and an ultrasonic input device 1358. The touch panel 1352 may be one of capacitive, resistive, infrared, microwave type touch panel. The touch panel 1352 may include a control circuit. In the case of the capacitive type touch panel, it is possible to detect physical contact or approximation. The touch panel 1352 may further include a tactile layer. In this case, the touch panel 1352 may provide the user with haptic reaction.

The (digital) pen sensor 1354 may be implemented with a sheet with the same or similar way as touch input of the user or a separate recognition sheet. The keys 1356 may include physical buttons, optical key, and keypad. The ultrasonic input device 1358 is a device capable of checking data by detecting sound wave through a microphone 1388 and may be implemented for wireless recognition. According to an embodiment, the electronic device 1301 may receive the user input made by means of an external device (e.g. computer or server) connected through the communication module 1320.

The display 1360 (e.g. display module 150) may include a panel 1362, a hologram device 1364, and a projector 1366. The panel 1362 may be a Liquid Crystal Display (LCD) panel or an Active Matrix Organic Light Emitting Diodes (AMOLED) panel. The panel 1362 may be implemented so as to be flexible, transparent, and/or wearable. The panel 1362 may be implemented as a module integrated with the touch panel 1352. The hologram device 1364 may present 3 dimensional image in the air using interference of light. The projector 1366 may project an image to a screen. The screen may be disposed inside or outside the electronic device. According to an embodiment, the display 1360 may include a control circuit for controlling the panel 1362, the hologram device 1364, and the projector 1366.

The interface 1370 may include an HDMI 1372, a USB 1374, an optical interface 1376, and a D0 subminiature (D-sub) 1378. The interface 1370 may include the communication interface 160 as shown in FIG. 1. Additionally or alternatively, the interface 1370 may include a Mobile High-definition Link (MHL) interface, a Secure Digital (SD)/MultiMediaCard (MMC) card interface, and infrared Data Association (irDA) standard interface.

The audio module 1380 may convert sound to electric signal and vice versa. At least a part of the audio module 1380 may be included in the input/output interface 140 as shown in FIG. 1. The audio module 1380 may process the audio information input or output through the speaker 1382, the receiver 1384, the earphone 1386, and the microphone 1388.

The camera module 1391 is a device capable of taking still and motion pictures and, according to an embodiment, includes at least one image sensor (e.g. front and rear sensors), a lens (not shown), and Image Signal Processor (ISP) (not shown), and a flash (e.g. LED or xenon lamp) (not shown).

The power management module 1395 may manage the power of the electronic device 1301. Although not shown, the power management module 1395 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 1396, charging voltage, current, and temperature. The battery 1396 may store or generate power and supply the stored or generated power to the electronic device 1301. The battery 1396 may include a rechargeable battery or a solar battery.

The indicator 1397 may display operation status of the electronic device 1301 or a part of the electronic device, booting status, messaging status, and charging status. The motor 1398 may converts the electronic signal to mechanical vibration. Although not shown, the electronic device 1301 may include a processing unit (e.g. GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

As described above, the electronic device operating method and apparatus of the present disclosure is capable of providing diverse screen displays in adaptation to various conditions to implement optimal environment for utilizing the electronic device, resulting in improvement of user convenience. Also, the electronic device operating method and apparatus of the present disclosure is advantageous in terms of facilitating navigation between folders by sorting the folders by hierarchical level.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

FIG. 14 illustrates communication protocols 1400 between a plurality of electronic devices (e.g., an electronic device 1410 and an electronic device 1430) according to various embodiments.

Referring to FIG. 14, for example, the communication protocols 1400 may include a device discovery protocol 1451, a capability exchange protocol 1453, a network protocol 1455, and an application protocol 1457.

According to an embodiment, the device discovery protocol 1451 may be a protocol by which the electronic devices (e.g., the electronic device 1410 and the electronic device 1430) detect external devices capable of communicating with the electronic devices, or connect with the detected external electronic devices. For example, the electronic device 1410 (e.g., the electronic device 101) may detect the electronic device 1430 (e.g., the electronic device 104) as an electronic device capable of communicating with the electronic device 1410 through communication methods (e.g., WiFi, BT, USB, or the like) which are available in the electronic device 1410, by using the device discovery protocol 1451. In order to connect with the electronic device 1430 for communication, the electronic device 1410 may obtain and store identification information on the detected electronic device 1430, by using the device discovery protocol 1451. The electronic device 1410 may initiate the communication connection with the electronic device 1430, for example, based on at least the identification information.

According to an embodiment, the device discovery protocol 1451 may be a protocol for authentication between a plurality of electronic devices. For example, the electronic device 1410 may perform authentication between the electronic device 1410 and the electronic device 1430, based on at least communication information {e.g., Media Access Control (MAC), Universally Unique Identifier (UUID), Subsystem Identification (SSID), Internet Protocol (IP) address} for connection with the electronic device 1430.

According to an embodiment, the capability exchange protocol 1453 may be a protocol for exchanging information related to service functions which can be supported by at least one of the electronic device 1410 or the electronic device 1430. For example, the electronic device 1410 and the electronic device 1430 may exchange information on service functions which are currently supported by each electronic device with each other through the capability exchange protocol 1053. The exchangeable information may include identification information indicating a specific service among a plurality of services supported by the electronic device 1010 and the electronic device 1030. For example, the electronic device 1010 may receive identification information for a specific service provided by the electronic device 1030 from the electronic device 1030 through the capability exchange protocol 1053. In this case, the first electronic device 1010 may determine whether the electronic device 1010 can support the specific service, based on the received identification information.

According to an embodiment, the network protocol 1455 may be a protocol for controlling the data flow which is transmitted and received between the electronic devices (e.g., the electronic device 1410 and the electronic device 1430) connected with each other for communication, for example, in order to provide interworking services. For example, at least one of the electronic device 1410 or the electronic device 1430 may perform the error control or the data quality control, by using the network protocol 1455. Alternatively or additionally, the network protocol 1455 may determine the transmission format of data transmitted and received between the electronic device 1410 and the electronic device 1430. In addition, at least one of the electronic device 1410 or the electronic device 1430 may manage a session (e.g., session connection or session termination) for the data exchange between them, by using the network protocol 1455.

According to an embodiment, the application protocol 1457 may be a protocol for providing a procedure or information to exchange data related to services which are provided to the external devices. For example, the electronic device 1410 (e.g., the electronic device 101) may provide services to the electronic device 1430 (e.g., the electronic device 104 or the server 106) through the application protocol 1457.

According to an embodiment, the communication protocol 1400 may include standard communication protocols, communication protocols designated by individuals or groups (e.g., communication protocols designated by communication device manufacturers or network providers), or a combination thereof.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

According to various embodiments of the present disclosure, the devices (e.g. modules or their functions) or methods may be implemented by computer program instructions stored in a non-transitory computer-readable storage medium. In the case that the instructions are executed by at least one processor (e.g. processor 120), the at least one processor may execute the functions corresponding to the instructions. The non-transitory computer-readable storage medium may be the memory 130. At least a part of the programming module may be implemented (e.g. executed) by the processor 120. At least a part of the programming module may include modules, programs, routines, sets of instructions, and processes for executing the at least one function.

The non-transitory computer-readable storage medium includes magnetic media such as a floppy disk and a magnetic tape, optical media including a Compact Disc (CD) ROM and a DVD ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various embodiments of the present disclosure.

The exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. An electronic device comprising:
a display;
a first memory having display data stored therein; and
at least one processor configured to:
generate a plurality of display layers for composing into one screen, each display layer including display data,
identify the display data included in each of the plurality of display layers as one of general data, protected data, or security data, and
when it is identified that the display data of at least one display layer of the plurality of display layers comprises the security data, control attributes of the plurality of display layers so as to display a display layer, which includes the security data, at an uppermost position with respect to remaining display layers of the plurality of display layers,
wherein the at least one processor is further configured to:
identify Z-axis values of the plurality of display layers including the display data, when displaying the display data through the display,
change a Z-axis value of the display layer including the security data so as to display the display layer including the security data, among the identified display layers, at the uppermost position, and
control the attributes of the plurality of display layers to opaquely display the display layer including the security data.

2. The electronic device of claim 1,
wherein the security data corresponds to data for which data integrity and data confidentiality are ensured, the protected data corresponds to data for which the data confidentiality is ensured, and the general data corresponds to data for which the data integrity and the data confidentiality are not ensured.

3. The electronic device of claim 1, wherein the security data corresponds to data for indicating that display data identified as protected data, among the display data, is among the plurality of display layers.

4. The electronic device of claim 2, wherein the at least one processor is further configured to transfer the display data included in the plurality of display layers to a composer while a particular application is executed.

5. The electronic device of claim 4, further comprising:
a second memory,
wherein the at least one processor is further configured to:
control the second memory to store the display data identified as the security data in the second memory,
control the second memory to store the display data identified as the protected data and the general data in the second memory, and
transfer a display layer including the security data stored in the second memory and display layers including the display data identified as the protected data and the general data through different paths to the composer, when transferring the display data to the composer.

6. The electronic device of claim 4,
wherein the at least one processor comprises a first processor and a second processor, wherein the second processor comprises a second memory and is separate from the first processor,
wherein the second memory is separate from the first memory and configured to store the security data, and
wherein the second processor is configured to compose the display layer including the security data stored in the second memory and displays layers including the protected data and the general data that are stored in the second memory.

7. The electronic device of claim 3, wherein the at least one processor is further configured to:
identify whether the display data included in each of the plurality of display layers comprises protected data,
control the attribute of the security data to represent that the protected data exists in at least one of the plurality of display layers, when the identified data comprises the protected data, and
control the attribute of the security data to represent that the protected data does not exist in at least one of the plurality of display layers, when the identified data comprises general data.

8. An electronic device comprising:
a display;
a memory having display data stored therein; and
at least one processor configured to:
generate a plurality of display layers for composing into one screen, each display layer including display data,
identify the display data included in each of the plurality of display layers as one of general data, protected data, or security data, and
when it is identified that the display data of at least one display layer of the plurality of display layers comprises the security data, control attributes of the plurality of display layers so as to display a display layer, which includes the security data, as opaque, and to display each display layer that includes protected data and general data as transparent,
wherein the at least one processor is further configured to:
identify Z-axis values of the plurality of display layers including the display data, when displaying the display data through the display,
change a Z-axis value of the display layer including the security data so as to display the display layer including the security data, among the identified display layers, at an uppermost position with respect to remaining display layers of the plurality of display layers, and
control the attributes of the plurality of display layers to opaquely display the display layer including the security data.

9. The electronic device of claim 8, wherein the at least one processor is further configured to:
control the attribute of the security data to represent that the protected data exists in at least one of the plurality of display layers, when the identified display data comprises the protected data, and control the attribute of the security data to represent that the protected data does not exist in at least one of the plurality of display layers, when the identified display data comprises the general data.

10. A method comprising:
identifying a plurality of display layers, each display layer including display data;
identifying the display data included in each display layer of the plurality of display layers as one of general data, protected data, or security data;
when it is identified that the display data of at least one display layer of the plurality of display layers comprises the security data, controlling attributes of the plurality of display layers to display a display layer, which includes the security data, at an uppermost position with respect to remaining display layers of the plurality of display layers;
generating the plurality of display layers based on the controlling of the attributes; and
displaying the generated plurality of display layers,
wherein the identifying of the plurality of display layers comprises identifying whether to display the plurality of display layers including the display data as a 3 dimensional (3D) image, and
wherein the controlling of the attributes of the plurality of display layers comprises:
identifying Z-axis values of the plurality of display layers including the display data, when displaying the plurality of display layers including the display data as the 3D image;
changing a Z-axis value of the display layer including the security data to display the display layer including the security data, among the identified display layers, at the uppermost position with respect to remaining display layers of the plurality of display layers; and
controlling the attributes of the plurality of display layers so as to display the display layer including the security data as opaque.

11. The method of claim 10, wherein the security data corresponds to data for which data integrity and data confidentiality are ensured, the protected data corresponds to data for which the data confidentiality is ensured, and the general data corresponds to data for which the data integrity and the data confidentiality are not ensured.

12. The method of claim 10, further comprising:
transferring the display data included in each of the plurality of display layers to a composer while a particular application is executed.

13. The method of claim 10, wherein the security data corresponds to data for indicating that display data identified as protected data, among the display data, is among the plurality of display layers.

14. The method of claim 10, wherein the controlling of the attributes of the plurality of display layers comprises:
controlling the attribute of the security data to represent that the protected data exists in at least one of the plurality of display layers, when the identified data comprises the protected data; and
controlling the attribute of the security data to represent that the protected data does not exist in at least one of the plurality of display layers, when the identified data comprises general data.

15. The method of claim 12, wherein the transferring of the display data to the composer comprises:
storing the display data identified as the security data in a first memory;
storing the display data identified as the protected data and the general data in a second memory; and
transferring the display layer including the security data and display layers including the protected data and the general data through different paths to the composer.

16. A method comprising:
identifying a plurality of display layers, each of the plurality of display layers including display data;
identifying the display data included in each display layer of the plurality of display layers as one of general data, protected data, or security data;
when it is identified that the display data of at least one display layer of the plurality of display layers comprises the security data, controlling attributes of the plurality of display layers to display a display layer, which includes the security data, as opaque and display each display layer that includes protected data and general data as transparent;
generating the plurality of display layers based on the controlling of the attributes; and
displaying the generated plurality of display layers,
wherein the identifying of the plurality of display layers comprises identifying whether to display the plurality of display layers including the display data as a 3 dimensional (3D) image, and
wherein the controlling of the attributes of the plurality of display layers comprises:
identifying Z-axis values of the plurality of display layers including the display data, when displaying the plurality of display layers including the display data as the 3D image;
changing a Z-axis value of the display layer including the security data to display the display layer including the security data, among the identified display layers, at an uppermost position with respect to remaining display layers of the plurality of display layers; and
controlling the attributes of the plurality of display layers so as to display the display layer including the security data as opaque.

17. The method of claim 16, wherein the controlling of the attributes of the plurality of display layers comprises:
controlling the attribute of the security data to represent that the protected data exists in at least one of the plurality of display layers, when the identified data comprises the protected data; and
controlling the attribute of the security data to represent that the protected data does not exist in at least one of the plurality of display layers, when the identified data comprises general data.

18. A non-transitory computer readable recording medium having a program of instructions recorded therein to be readable by at least one processor for instruction the at least one processor to execute a computer process for performing a method, the method comprising:
identifying a plurality of display layers, each of the plurality of display layers including display data;
identifying the display data included in each of the plurality of display layers as one of general data, protected data, or security data;
when it is identified that the display data of at least one layer of the plurality of display layers comprises the security data, controlling attributes of the plurality of display layers so as to display a display layer, which includes the security data, at an uppermost position with respect to remaining display layers of the plurality of display layers; and generating the plurality of display layers based on the controlling of the attributes, wherein the identifying of the plurality of display layers comprises identifying whether to display the plurality of display layers including the display data as a 3 dimensional (3D) image, and wherein the controlling of the attributes of the plurality of display layers comprises:

identifying Z-axis values of the plurality of display layers including the display data, when displaying the plurality of display layers including the display data as the 3D image;

changing a Z-axis value of the display layer including the security data to display the display layer including the security data, among the identified display layers, at the uppermost position with respect to remaining display layers of the plurality of display layers; and controlling the attributes of the plurality of display layers so as to display the display layer including the security data as opaque.

* * * * *